(12) United States Patent
Huang et al.

(10) Patent No.: US 9,426,184 B2
(45) Date of Patent: Aug. 23, 2016

(54) DOCKEE-CENTRIC WIRELESS DOCKING

(71) Applicant: QUALCOMM Incorporated, San Diego, CA (US)

(72) Inventors: Xiaolong Huang, San Diego, CA (US); Vijayalakshmi R. Raveendran, San Diego, CA (US); Xiaodong Wang, San Diego, CA (US); Hongyu Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 13/793,056

(22) Filed: Mar. 11, 2013

(65) Prior Publication Data
US 2014/0146745 A1    May 29, 2014

Related U.S. Application Data

(60) Provisional application No. 61/730,423, filed on Nov. 27, 2012, provisional application No. 61/739,430, filed on Dec. 19, 2012.

(51) Int. Cl.
| | |
|---|---|
| H04L 12/28 | (2006.01) |
| H04L 29/06 | (2006.01) |
| H04L 29/08 | (2006.01) |
| H04W 12/08 | (2009.01) |
| G06F 1/16 | (2006.01) |
| H04J 1/16 | (2006.01) |
| H04M 1/04 | (2006.01) |
| H04M 1/725 | (2006.01) |

(52) U.S. Cl.
CPC .......... *H04L 65/1069* (2013.01); *G06F 1/1632* (2013.01); *H04L 63/20* (2013.01); *H04L 67/16* (2013.01); *H04W 12/08* (2013.01); *H04L 67/12* (2013.01); *H04L 67/2814* (2013.01); *H04M 1/04* (2013.01); *H04M 1/7253* (2013.01); *H04M 1/72527* (2013.01)

(58) Field of Classification Search
USPC .......................................... 370/329, 278, 254
See application file for complete search history.

(56) References Cited

U.S. PATENT DOCUMENTS

| 8,019,883 B1 | 9/2011 | Margulis |
| 8,254,992 B1 | 8/2012 | Ashenbrenner et al. |
| 2006/0061963 A1 | 3/2006 | Schrum |

(Continued)

FOREIGN PATENT DOCUMENTS

| WO | WO-2013176748 | 11/2013 |
| WO | WO-2013177190 | 11/2013 |

OTHER PUBLICATIONS

International Search Report and Written Opinion—PCT/US2013/071419—ISA/EPO—Feb. 27, 2014.

*Primary Examiner* — John Pezzlo
(74) *Attorney, Agent, or Firm* — Charles E. Eggers

(57) ABSTRACT

In one example, a method includes sending a request to a wireless docking host to select one or more peripheral functions available via the wireless docking host in accordance with authentication and association information associated with a docking session with the wireless docking host. The method further includes sending a request to the wireless docking host to establish one or more payload connections with the wireless docking host, wherein the one or more payload connections are configured to communicate data via the wireless docking host for the selected one or more peripheral functions.

96 Claims, 19 Drawing Sheets

(56) References Cited

U.S. PATENT DOCUMENTS

| | | | |
|---|---|---|---|
| 2007/0171921 A1* | 7/2007 | Wookey | G06F 3/1415 370/401 |
| 2008/0195788 A1 | 8/2008 | Tamir et al. | |
| 2008/0252419 A1 | 10/2008 | Batchelor et al. | |
| 2010/0322213 A1 | 12/2010 | Liu et al. | |
| 2012/0099566 A1 | 4/2012 | Laine et al. | |
| 2012/0265913 A1 | 10/2012 | Suumaeki et al. | |
| 2013/0311692 A1* | 11/2013 | Huang et al. | 710/303 |
| 2013/0311694 A1* | 11/2013 | Bhamidipati et al. | 710/303 |

* cited by examiner

| BIT OFFSET | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | VERSION 422 | | | | E | RESERVED 426 | | | MESSAGE TYPE ID 428 | | | | | | | |
| 16 | LENGTH 430 | | | | | | | | | | | | | | | |
| 32 | DOCKEE ID 432 | | | | | | | | | | | | | | | |
| 48 | SESSION ID 434 | | | | | | | | | | | | | | | |
| 64 | EXTENSION HEADER LENGTH 436 | | | | | | | | | | | | | | | |
|  | EXTENSION HEADER 438 | | | | | | | | | | | | | | | |
|  | MESSAGE BODY 440 | | | | | | | | | | | | | | | |

DOCKEE-CENTRIC WIRELESS DOCKING

This application claims the benefit of U.S. Provisional Application No. 61/730,423 entitled "DOCKEE-CENTRIC WIRELESS DOCKING," filed Nov. 27, 2012, and U.S. Provisional Application No. 61/739,430 entitled "DOCKEE-CENTRIC WIRELESS DOCKING," filed Dec. 19, 2012, the entire content each of which is incorporated by reference herein.

TECHNICAL FIELD

This disclosure relates to techniques for docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations require a connection between the electronic device and the docking station. Additionally, the electronic device and the docking station must first establish docking communications before docking functions may be used.

SUMMARY

In some examples, this disclosure describes techniques for a wireless docking system environment in which a wireless dockee device is enabled to configure peripheral functions, configure and store a wireless docking environment, and perform other wireless docking functions.

In one example, a method includes sending a request to a wireless docking host to select one or more peripheral functions available via the wireless docking host in accordance with authentication and association information associated with a docking session with the wireless docking host. The method further includes sending a request to the wireless docking host to establish one or more payload connections with the wireless docking host, wherein the one or more payload connections are configured to communicate data via the wireless docking host for the selected one or more peripheral functions.

In another example, a method includes responding to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions. The method further includes responding to a payload connection request from the wireless device indicating one or more payload connections configured to communicate data for the one or more selected peripheral functions by sending a payload connection response to the wireless device, the payload connection response comprising information associated with establishing the one or more payload connections.

In another example, a device includes one or more processors. The one or more processors are configured to send a request to a wireless docking host to select one or more peripheral functions available via the wireless docking host in accordance with authentication and association information associated with a docking session with the wireless docking host. The one or more processors are further configured to send a request to the wireless docking host to establish one or more payload connections with the wireless docking host, wherein the one or more payload connections are configured to communicate data via the wireless docking host for the selected one or more peripheral functions.

In another example, a device includes one or more processors. The one or more processors are configured to respond to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions. The one or more processors are further configured to respond to a payload connection request from the wireless device indicating one or more payload connections configured to communicate data for the one or more selected peripheral functions by sending a payload connection response to the wireless device, the payload connection response comprising information associated with establishing the one or more payload connections.

In another example, an apparatus includes means for sending a request to a wireless docking host to select one or more peripheral functions available via the wireless docking host in accordance with authentication and association information associated with a docking session with the wireless docking host. The apparatus further includes means for sending a request to the wireless docking host to establish one or more payload connections with the wireless docking host, wherein the one or more payload connections are configured to communicate data via the wireless docking host for the selected one or more peripheral functions.

In another example, an apparatus includes means for responding to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions. The apparatus further includes means for responding to a payload connection request from the wireless device indicating one or more payload connections configured to communicate data for the one or more selected peripheral functions by sending a payload connection response to the wireless device, the payload connection response comprising information associated with establishing the one or more payload connections.

In another example, a computer-readable storage medium includes instructions stored thereon that, when executed, configure one or more processors to send a request to a wireless docking host to select one or more peripheral functions available via the wireless docking host in accordance with authentication and association information associated with a docking session with the wireless docking host. The instructions further configure the one or more processors to send a request to the wireless docking host to establish one or more payload connections with the wireless docking host, wherein the one or more payload connections are configured to communicate data via the wireless docking host for the selected one or more peripheral functions.

In another example, a computer-readable storage medium includes instructions stored thereon that, when executed, configure one or more processors to respond to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions. The instructions further configure the one or more processors to respond to a payload connection request from the wireless device indicating one or more payload connections configured to communicate data for the one or more selected peripheral functions by sending a payload connection response to the wireless device, the payload connection response comprising information associated with establishing the one or more payload connections.

The details of one or more examples are set forth in the accompanying drawings and the description below. Other features, objects, and advantages will be apparent from the description and drawings, and from the claims.

BRIEF DESCRIPTION OF DRAWINGS

FIG. 4D is a conceptual diagram illustrating another example binary docking protocol message format in accordance with one or more examples of this disclosure.

DETAILED DESCRIPTION

As described in greater detail below, this disclosure describes wireless communication techniques, protocols, methods, and devices applicable to a docking system environment in which a dockee, such as a mobile device, may dock wirelessly with a docking host or docking station. The dockee and docking host may establish a docking session with each other. The docking host may enable interaction between the dockee and any number of peripheral devices that are coupled to the docking host. For example, the peripherals may include displays, projectors, speakers, keyboards, mice, joysticks, data storage devices, network interface devices, other docking hosts, remote controls, cameras, microphones, printers, or other devices. Such peripheral devices may include stand-alone devices or components of devices such as other computers, in different examples. A user may wirelessly dock a dockee device, such as a mobile handset, with a docking host, and enable interaction between the dockee device and any of the peripherals. The dockee may be enabled to control aspects of the docking session, and to store certain information from one docking session to use in future docking sessions, obviating the need to repeat exchanges of the same information to set up future docking sessions, in some examples.

Figure 1:
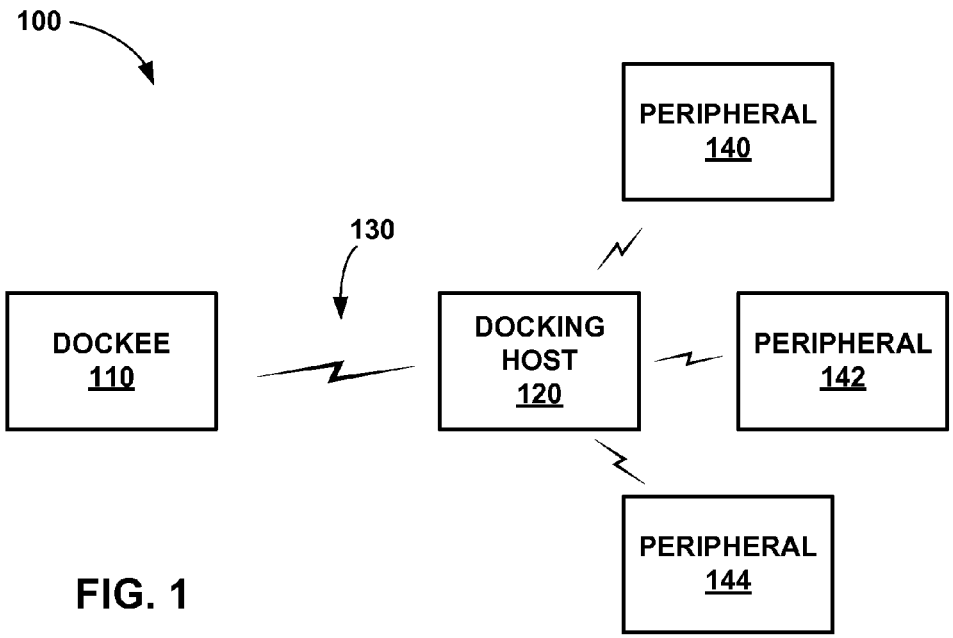
FIG. 1 is a conceptual diagram illustrating an example wireless docking system environment in accordance with one or more examples of this disclosure.

FIG. 1 is a conceptual diagram of a wireless docking environment 100 in which a dockee 110 communicates with a docking host 120, or docking center 120, over a wireless communication channel 130. Docking host 120 is communicatively coupled with various peripheral devices 140, 142, 144, which docking host 120 may make accessible to dockee 110. Dockee 110 may be a mobile device such as a smartphone or other mobile handset, a tablet computer, a laptop computer, or other electronic device. Docking host 120 may be a wireless docking host device that serves as a connectivity agent within a computing environment. Docking host 120 may be a dedicated wireless dock, or may also be implemented in a smartphone or other mobile handset, a tablet computer, a laptop computer, or other electronic device, or as a component or subsystem of any of the above. Peripheral devices 140, 142, 144 may include displays, projectors, speakers, keyboards, mice, joysticks, data storage devices, network interface devices, other docking hosts, remote controls, cameras, microphones, printers, or any of various other devices capable of communication with docking host 120. Peripheral devices 140, 142, 144 may also all be coupled to docking host 120 via wireless communication channels. Some peripheral devices may also be coupled to docking host 120 via wired communication channels, in some examples.

Wireless communication channel 130 may be any channel capable of propagating communicative signals between dockee 110 and docking host 120. In some examples, wireless communication channel 130 may be implemented in radio frequency communications in frequency bands such as the 2.4 gigahertz (GHz) band, the 5 GHz band, the 60 GHz band, or other frequency bands. In some examples, wireless communication channel 130 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols. Dockee 110 may establish communication with docking host 120 over wireless communication channel 130 automatically once dockee 110 and docking host 120 come within operative communication range of each other, or manually in response to a user input, in different examples. An example of dockee 110 and docking host 120 establishing initial docking communications with each other is depicted in FIG. 2.

Figure 2:
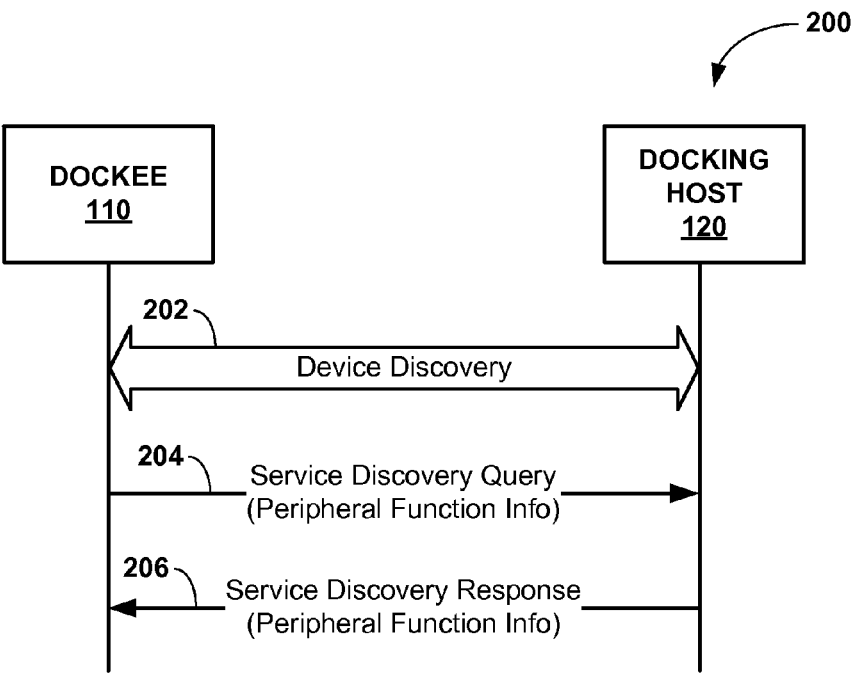
FIG. 2 is a communication diagram illustrating an example procedure for a communication flow between a dockee and a docking host to exchange initial wireless communications with each other prior to establishing a wireless docking session with each other, in accordance with some examples of this disclosure.

FIG. 2 is a communication diagram illustrating an example procedure 200 for a communication flow between a dockee 110 and a docking host 120 to exchange initial wireless communications with each other prior to establishing a wireless docking session with each other, in accordance with some examples of this disclosure. The procedure 200 for discovery and initial communication provides for the dockee 110 to query the docking host 120 for what peripheral functions docking host 120 has access to and might make accessible to dockee 110, from among the peripherals coupled to docking host 120. This procedure 200 may be referred to as Peripheral Function Discovery.

As shown in the communication flow in FIG. 2, the docking host 120 and the dockee 110 may initially exchange device discovery communications (202). The docking host 120 may send a service discovery query to query the docking host 120 for peripheral function information (204), or information on peripheral functions available to the docking host 120. Applicable peripheral functions may be available to docking host 120 from any one or more peripheral devices coupled to docking host 120, as described above with peripheral devices 140, 142, 144 in the context of FIG. 1. The docking host 120, serving as a wireless docking host, may send a service discovery response that provides its peripheral function information (206). The docking host 120 may thereby advertise its peripheral functions in pre-association service discovery communications (204, 206) with the dockee 110. These communications are pre-association in that they take place prior to initiation of a wireless docking session between the dockee 110 and the docking host 120. The dockee 110 may thus discover the peripheral functions associated with the docking host 120 from the service discovery response 206 as part of the pre-association service discovery communications shown in FIG. 2. Additional details of these pre-association service discovery communications 204, 206 are provided below.

The device discovery communications 202 and the service discovery communications 204, 206 as shown in FIG. 2 may be implemented in Data Link Layer, or layer 2 (L2), communications. The L2 communications may be conveyed over any of various types of physical layer (PHY) communication channels, including any of the Wi-Fi or WiGig standards and/or IEEE 802.11 protocols as discussed above. The service discovery query 204 sent by dockee 110 and the service discovery response 206 sent by docking host 120 may use service discovery action frames. An example action frame may include a Media Access Control (MAC) header, a frame category, action details, and a frame check sequence (FCS). The action details in the service discovery query 204 sent by dockee 110 may include object identifier (OI) fields and query data fields. Dockee 110 may set an OI field in the service discovery action frame to 0x506F9A, i.e., the Organizationally Unique Identifier (OUI) of the Wi-Fi Alliance (WFA). Dockee 110 may also set additional fields in the service discovery action frame, such as an OUI subtype field and a service protocol type field. Dockee 110 may set the query data field of the service discovery query action frame to include a list of docking sub-element identifiers (ID's) to query for information on available docking sub-elements. In some examples, dockee 100 may communicate with docking host 120 using plaintext payloads that include SOAP requests and responses (e.g., in accordance with the SOAP specification defined at www.w3.org/TR/soap12-part1) and GENA (General Event Notification Architecture) notifications running on a packet-based transport layer protocol stack, while in other examples, dockee 100 may communicate with docking host 120 using a binary protocol running on a packet-based transport layer protocol stack, as further described below. Dockee 110 may also set a service transaction identifier (ID) in the query data field. Examples of the query data fields and the docking sub-element ID's for examples using SOAP and GENA payloads are shown as follows in Tables 1 and 2.

TABLE 1

Query Data Fields

| Field | Length (Octets) | Description |
| --- | --- | --- |
| List of Docking Sub-element IDs | Variable | Requested Docking sub-elements as an array of sub-element IDs as per Table 2. |

TABLE 2

Docking Sub-element IDs

| Docking Sub-element ID | Description |
| --- | --- |
| ... | ... |
| 7 | Peripheral Function Information |
| 8 | Docking Host SOAP URL |
| 9 | Docking Host GENA URL |
| 10-255 | Reserved |

In some examples that may use a binary protocol instead of SOAP and GENA payloads, dockee 100 may communicate with docking host 120 without requiring the use of docking sub-element ID's 8 and 9 as listed in Table 2.

Docking host 120 may respond to receiving service discovery query 204 from dockee 110 by sending service discovery response 206. Docking host 120 may include in service discovery response 206 a service discovery action frame with a service response data field that includes a list of requested docking sub-elements. Docking host 120 may include a service transaction ID in the service response type-length-value (TLV) element that matches the service transaction ID in the query data field of the service discovery query 204 from dockee 110, to ensure that dockee 110 can associate the service discovery response 206 with the service discovery query 204. Docking host 120 may set a docking information element (IE) in Docking Service Discovery action frames included in the service discovery response 206. In some examples, docking host 120 may set the docking IE to include sub-elements as shown as follows in Table 3.

TABLE 3

Information Sub-elements in Docking IE in Docking Service Discovery Response

| Sub-element Name | Requirements |
| --- | --- |
| ... | ... |
| Peripheral Function Information | If requested, the Peripheral Function Information sub-element may be present in the Docking IE in the Docking Service Discovery Response action frames that docking host 120 transmits. |
| Docking Host SOAP URL | If requested, the Docking Host SOAP URL sub-element may be present in the Docking IE in the Docking Service Discovery Response action frames that docking host 120 transmits. |

TABLE 3-continued

Information Sub-elements in Docking IE in Docking Service Discovery Response

| Sub-element Name | Requirements |
| --- | --- |
| Docking Host GENA URL | If requested, the Docking Host SOAP URL sub-element may be present in the Docking IE in the Docking Service Discovery Response action frames that docking host 120 transmits. |
| ... | ... |

These docking information sub-elements provided by the docking host 120 in service discovery response 206, i.e., the Peripheral Function Information Sub-element, the Docking Host SOAP Uniform Resource Locator (URL) Sub-element, and the Docking Host General Event Notification Architecture (GENA) URL Sub-element, are further described as follows. In examples that use a binary protocol, docking center 120 may omit the docking host SOAP URL and docking host GENA URL from the information sub-elements from the docking information element in the docking service discovery response. In some examples that use the SOAP and GENA payloads, a wireless dockee 110 and a wireless docking host 120 may both send SOAP requests and responses to each other, and wireless docking host 120 may send GENA notifications to wireless dockee 110, where both the SOAP and GENA payloads may be sent over a packet-based transport layer protocol stack, in accordance with specifications such as Transmission Control Protocol/Internet Protocol (TCP/IP) or User Datagram Protocol/IP (UDP/IP), for example, to specified URLs, and potentially also to specified port numbers, such as TCP port number 80 (commonly associated with HTTP).

The Peripheral Function Information sub-element may provide the peripheral function (PF) information of peripherals hosted by docking host 120. The Peripheral Function Information sub-element may have a data structure as shown in Table 4, with additional information on the listed fields thereafter.

TABLE 4

Peripheral Function Information Sub-element

| Field | Length (Octets) | Type |
| --- | --- | --- |
| n_PFs | 1 | uimsbf |
| for (i = 0; i < n_PFs; i++) { | | |
| PF_ID | 2 | uimsbf |
|     PF_type | 2 | uimsbf |
|     PF_name | Variable | UTF-8_String( ) |
|     PF_capability | Variable | UTF-8_String( ) |
|     PF_state | 1 | uimsbf |
|     n_PFPs | 1 | uimsbf |
|     for (i = 0; I < n_PFPs; i++) { | | |
|         PFP_ID | 1 | uimsbf |
|     } | | |
| } | | |

The field "n_PFs" may contain the number of peripheral functions (PF's) hosted by docking host 120 that generate this PF Status information data structure. Any one or more peripheral device coupled to docking host 120 (e.g., peripheral devices 140, 142, 144 of FIG. 1) may provide one or more peripheral functions.

The field "PF_ID" may contain the ID of a particular peripheral function (PF). As indicated by the line "for (i=0; i<n_PFs; i++)," the peripheral function information sub-element may include a peripheral function ID and associated information for each peripheral function ID for each of the "n_PFs" peripheral functions. The peripheral function ID may be unique for all peripheral functions that docking host 120 currently hosts or centers or has ever hosted or centered. Docking host 120 may specify when a peripheral function is new and when the peripheral function is not new (e.g., when a mouse that provides a mouse peripheral function has been replaced by another mouse that may provide a mouse peripheral function).

The field "PF_type" may indicate the peripheral function type of the peripheral function. An illustrative set of peripheral function types is listed below in Table 5.

The field "PF_name" may contain a user-friendly name of the peripheral function. This peripheral function name may be unique for all PFs available to docking host 120. The format of the peripheral function name may be a UTF-8_String( ) structure, in some examples.

The field "PF_capability" may contain the capability of the peripheral function as reported by docking host 120. The format of the peripheral function capability may also be a UTF-8_String( ) structure, in some examples.

The field "n_PFPs" may contain the number of Peripheral Function Protocols that can be used to support the use of the particular peripheral referred to by a given PF_ID. The field "PFP_ID" may contain the identifier (ID) of the Peripheral Function Protocol that can be used to support the use of the particular peripheral. An illustrative set of peripheral function protocols is listed below in Table 6. The field "PF_state" may contain the state of the peripheral function, such as with the example states defined below in Table 7.

TABLE 5

Peripheral Function Type

| PF Type | Description |
| --- | --- |
| 0 | Mouse |
| 1 | Keyboard |
| 2 | Remote Control |
| 3 | Display |
| 4 | Speaker |
| 5 | Microphone |
| 6 | Storage |
| 7 | Joystick |
| 8-65535 | Reserved |

TABLE 6

Peripheral Function Protocol Identifier

| PFP ID | Description |
| --- | --- |
| 0 | Miracast |
| 1 | WiFi Serial Bus (WSB) |
| 2 | Bluetooth |
| 3 | WiGig Display Extension (WDE) |
| 4 | WiGig Serial Extension (WSE) |
| 5-255 | Reserved |

TABLE 7

PF_state values

| State | Value | Description |
| --- | --- | --- |
| DISCONNECTED | 0x01 | The PF cannot be reached by its managing wireless docking host (WDH, e.g., docking host 120) and its managing WDH has no further information on how to make it available for docking. |

TABLE 7-continued

PF_state values

| State | Value | Description |
| --- | --- | --- |
| SLEEP | 0x02 | The PF has let its managing WDH known that it is going to low-power mode or to be switched-off and that user action on the PF is required to make the PF available for docking again. On the other hand, if a PF can be woken up without requiring user action (e.g. through Wake-on-LAN or by changing the USB power state), the PF may not be given the PF_state "SLEEP". Such PFs may be given the state "NOT PAIRED" or "AVAILABLE". |
| NOT_PAIRED | 0x03 | The only thing that needs to be done for making this PF available for docking is that a user action is needed for pairing the PF with its managing WDH. |
| AVAILABLE | 0x04 | The PF is available for docking. |
| NOT_AVAILABLE | 0x05 | The PF is not available for docking. |

The Docking Host SOAP URL sub-element provides the URL of the SOAP command service for the docking protocol provided by the docking host 120. The Docking Host SOAP URL sub-element may have the data structure shown as follows in Table 8.

TABLE 8

Docking Host SOAP URL Sub-element

| Field | Length (Octets) | Type | Description |
| --- | --- | --- | --- |
| port_num | 2 | uimsbf | Port number |
| URL_path | Variable | UTF-8_String( ) | Substring of URL path, percent-encoded as per Internet Engineering Task Force (IETF) Request for Comment (RFC) 3986 |

The Docking Host GENA URL sub-element provides the URL of the GENA notification service for the docking protocol provided by the docking host 120. The Docking Host GENA URL sub-element may have the data structure shown as follows in Table 9.

TABLE 9

Docking Host GENA URL Sub-element

| Field | Length (Octets) | Type | Description |
| --- | --- | --- | --- |
| port_num | 2 | uimsbf | Port number |
| URL_path | Variable | UTF-8_String( ) | Substring of URL path, percent-encoded as per IETF RFC 3986 |

As described in greater detail below, this disclosure further describes wireless communication techniques, protocols, methods, and devices that enable a Dockee-Centric Docking Protocol in a docking system environment in which a dockee device, such as a wireless device, may dock wirelessly with a docking host. An overview of example Dockee-Centric Docking Protocol Procedures is provided as follows. An example docking protocol may include the following procedural components: Docking Session Setup, Peripheral Function Inquiry, Peripheral Function Selection, and Session Teardown. These are illustrated in the example of FIG. 3.

Figure 3:
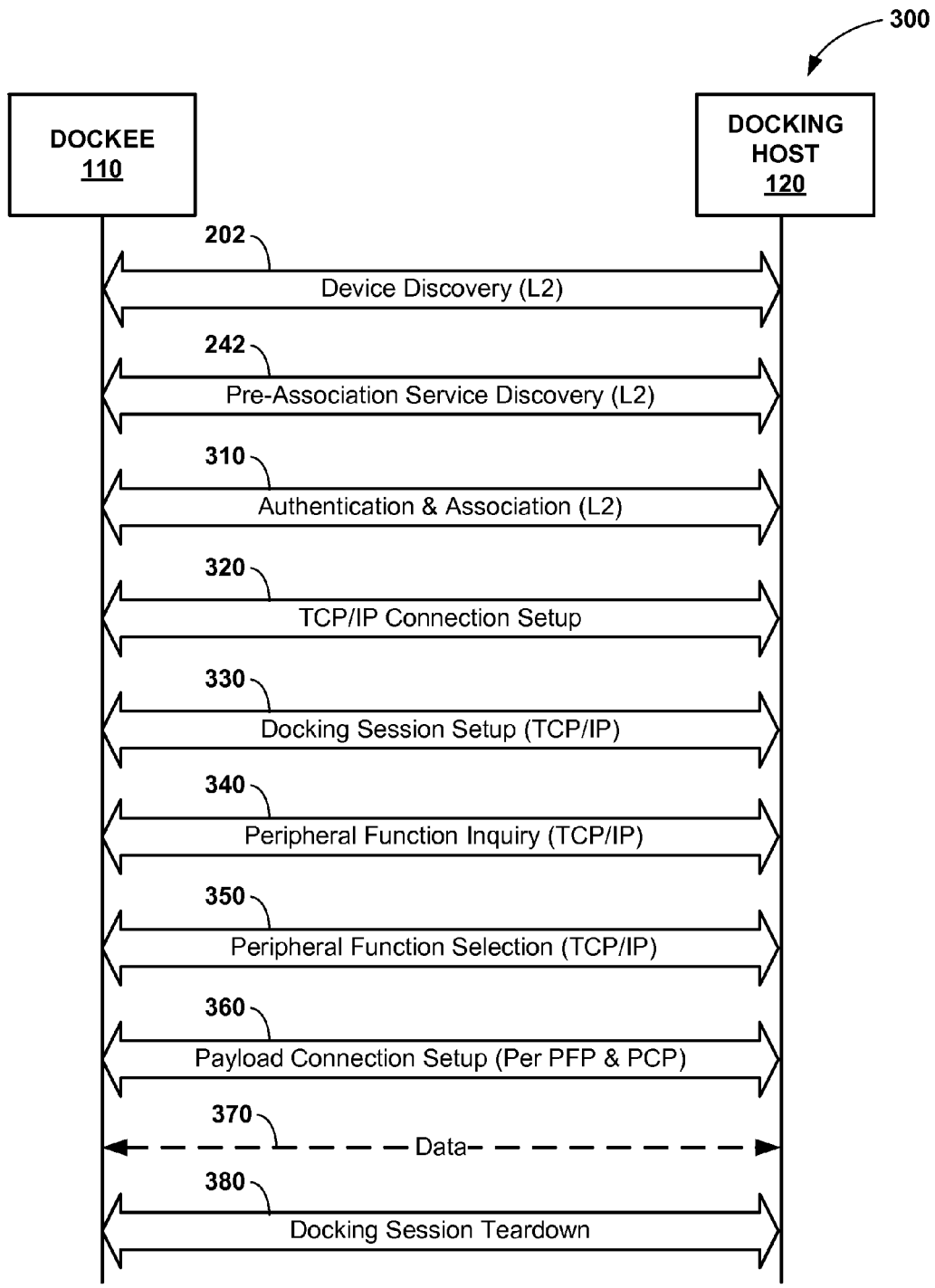
FIG. 3 is a communication diagram illustrating a communication flow for an example procedure between a dockee and a docking host to establish, operate, and later tear down or terminate a dockee-centric wireless docking session with each other, in accordance with some examples of this disclosure.
Figure 4:
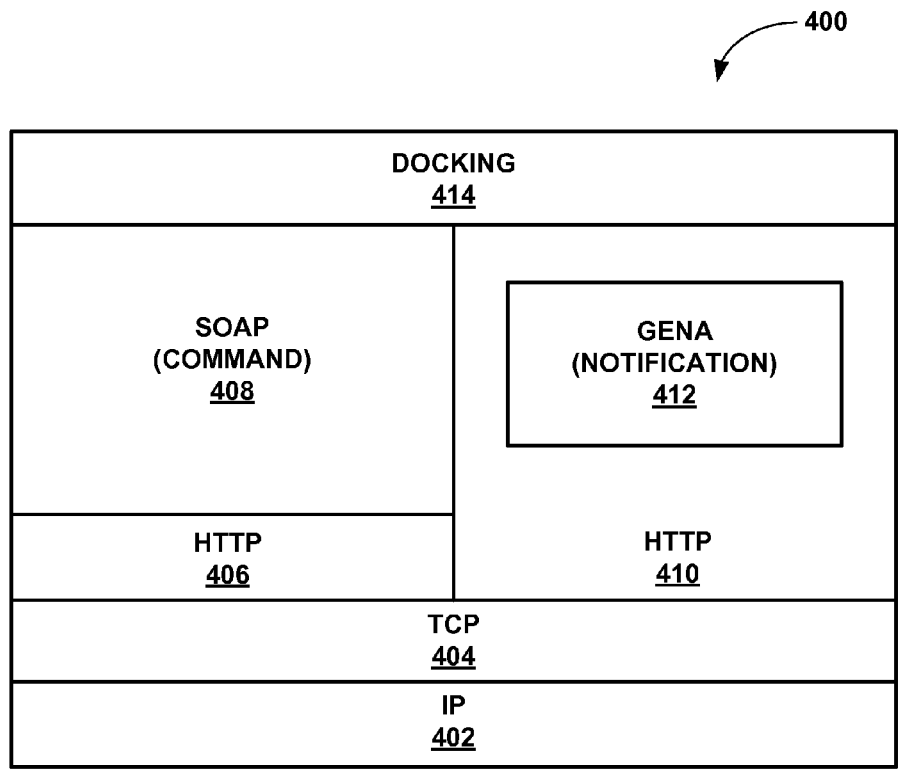
FIG. 4 is a conceptual diagram illustrating an example wireless docking communications protocol stack in accordance with one or more examples of this disclosure.
Figure 4B:
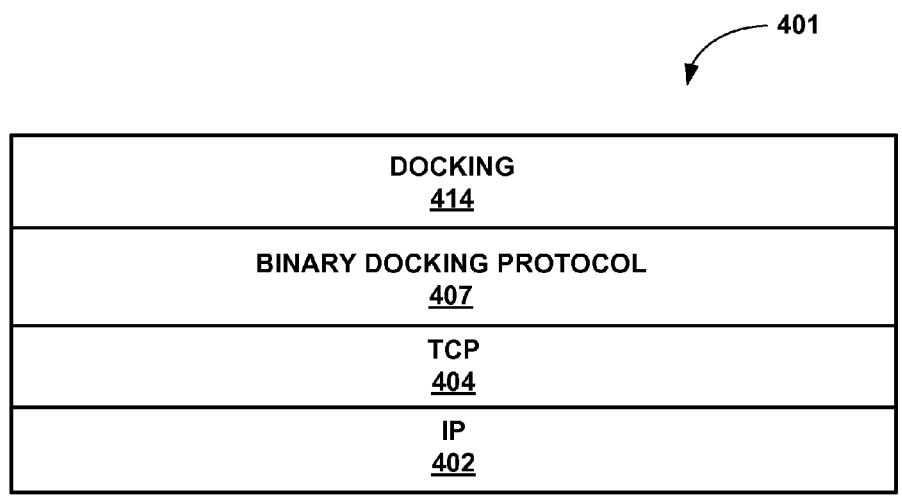
FIG. 4B is a conceptual diagram illustrating another example wireless docking communications protocol stack in accordance with one or more examples of this disclosure.

FIG. 3 is a communication diagram illustrating a communication flow for an example procedure 300 between a dockee 110 and a docking host 120 to establish, operate, and later tear down or terminate a dockee-centric wireless docking session with each other, in accordance with some examples of this disclosure. This procedure 300 may be referred to as a Dockee-Centric Docking Protocol Procedure. In the example of FIG. 3, procedure 300 includes device discovery 202, as shown in FIG. 2, and pre-association service discovery 242, corresponding to service discovery query 204 and service discovery response 206 as shown in FIG. 2. In the example of FIG. 3, procedure 300 further includes authentication and association 310, connection setup 320, docking session setup 330, peripheral function inquiry 340, peripheral function selection 350, payload connection setup 360, data 370, and docking session teardown 380. Device discovery 202, pre-association service discovery 242, and authentication and association 310 may be implemented in L2 communications, while connection setup 320, docking session setup 330, peripheral function inquiry 340, peripheral function selection 350 may be implemented in TCP/IP communications, as shown in the example of FIG. 3. In the example of FIG. 3, the Dockee-Centric Docking Protocol may be communicated via transport layer communications such as in accordance with Internet Protocol (IP). The Dockee-Centric Docking Protocol may use SOAP and GENA payloads in some examples, and a binary protocol in some examples, for message transactions. An example of the protocol stack using SOAP and GENA payloads is shown in FIG. 4, while an example of the protocol stack using a binary protocol is shown in FIG. 4B. A TCP/IP port may be specified in the wireless docking center control URL sub-element in the pre-association service discovery 242 of procedure 300.

In example procedure 300 of FIG. 3, each of the communications shown between dockee 110 and docking host 120 may include one or more communications, such as queries, requests, etc., from the dockee 110, and one or more communications, such as responses, notifications, etc., from the docking host 120. Examples of these communications from dockee 110 as part of procedure 300 are as follows.

As part of device discovery 202, dockee 110 may send one or more communications to discover wireless docking host 120. As part of pre-association service discovery 242, dockee 110 may query the wireless docking host 120 for information on peripheral functions available via the wireless docking host 120. As part of authentication and association 310, dockee 110 may exchange authentication and association information with the wireless docking host 120. As part of connection setup 320, dockee 110 may send a request to set up a packet-based communication connection with the wireless docking host 120. As part of docking session setup 330, dockee 110 may send a request to set up a docking session over the packet-based communication connection with the wireless docking host 120. As part of peripheral function inquiry 340, dockee 110 may send an inquiry request to the wireless docking host 120 for information on peripheral functions available via the wireless docking host 120 based on the authentication and association information from authentication and association 310. As part of peripheral function selection 350, dockee 110 may send a request to select one or more of the peripheral functions from the wireless docking host 120. As part of payload connection setup 360, dockee 110 may send a request to set up one or more payload connections with the wireless docking host 120 wherein the one or more payload connections are configured to communicate data via the wireless docking host 120 for the one or more of the peripheral functions.

Dockee 110 and docking host 120 may then exchange data 370 for the one or more peripheral functions, for one or more peripherals, over the one or more payload connections, using one or more peripheral function protocols. Dockee 110 and/or wireless docking host 120 may later send communications as part of docking session teardown 380. Further details on some aspects of these communications in procedure 300 are provided below.

In example procedure 300 of FIG. 3, from the perspective of the wireless docking host 120, examples of these communications from wireless docking host 120 as part of procedure 300 are as follows. As part of device discovery 202, docking host 120 may send one or more communications to discover wireless dockee 110. As part of pre-association service discovery 242, wireless docking host 120 may respond to a query from the wireless dockee 110 for information on available peripheral functions by sending peripheral function information to the wireless dockee 110. As part of authentication and association 310, wireless docking host 120 may exchange authentication and association information with the wireless dockee 110. As part of connection setup 320, docking host 120 may respond to a request from the wireless dockee 110 to set up a packet-based communication connection by sending a connection setup response to the wireless dockee 110. As part of docking session setup 330, wireless docking host 120 may respond to a request from the wireless dockee 110 to set up a docking session over the packet-based communication connection by sending a docking session response to the wireless dockee 110. As part of peripheral function inquiry 340, wireless docking host 120 may respond to an inquiry request from the wireless dockee 110 for information on peripheral functions available based on the authentication and association information by sending a response to the inquiry request. As part of peripheral function selection 350, wireless docking host 120 may respond to a selection request from the wireless dockee 110 indicating one or more selected peripheral functions from the peripheral functions by sending a response to the selection request. As part of payload connection setup 360, wireless docking host 120 may respond to a payload connection request from the wireless dockee 110 indicating one or more payload connections configured to communicate data via for the one or more selected peripheral functions by sending a response to the payload connection request.

As noted above, dockee 110 and docking host 120 may then exchange data 370 for the one or more peripheral functions, for one or more peripherals, over the one or more payload connections, using one or more peripheral function protocols. As noted above, dockee 110 and/or wireless docking host 120 may later send communications as part of docking session teardown procedure 380, which may be used to terminate a session. Further details on some aspects of these communications in procedure 300 are provided below.

FIG. 4 is a conceptual diagram illustrating an example wireless docking communications protocol stack 400 in accordance with one or more examples of this disclosure that use SOAP and GENA payloads. As shown in FIG. 4, the dockee 110 may use SOAP to send commands to the docking host 120. The URL for SOAP at the docking host 120 is given in the Docking Host SOAP URL Sub-element of the Docking IE during the device discovery 202. A SOAP request of the docking protocol may use the following example format in some examples. The elements to be included in the SOAP body of a docking protocol message may be described in its corresponding docking protocol procedure in some examples.

```
POST [path] HTTP/1.1
Host: [WDH SOAP service URL]
Content-Type: application/soap+xml; charset=utf-8
Content-Length: [nnn]
<?xml version="1.0"?>
<soap:Envelope
  xmlns:soap="http://www.w3.org/2001/12/soap-envelope"
  soap:encodingStyle="http://www.w3.org/2001/12/soap-encoding">
  <soap:Body>
    </[element name] xmlns:xsi="http://www.w3.org/2001/
XMLSchema-instance" xsi:noNamespaceSchemaLocation=
"[WFA URL]/wdck-messages.xsd">
        [element content]
    </[element name]>
  </soap:Body>
</soap:Envelope>
```

A SOAP response of the docking protocol may use the following format in some examples. The elements to be included in the SOAP body of a docking protocol message may be described in its corresponding docking protocol procedure in some examples.

```
HTTP/1.1 200 OK
Content-Type: application/soap+xml; charset=utf-8
Content-Length: [nnn]
<?xml version="1.0"?>
<soap:Envelope
  xmlns:soap="http://www.w3.org/2001/12/soap-envelope"
  soap:encodingStyle="http://www.w3.org/2001/12/soap-encoding">
  <soap:Body>
    </[element name] xmlns:xsi="http://www.w3.org/2001/
XMLSchema-instance" xsi:noNamespaceSchemaLocation=
"[WFA URL]/wdck-messages.xsd">
        [element content]
    </[element name]>
  </soap:Body>
</soap:Envelope>
```

GENA may be used for the docking host 120 to send notifications to the dockee 110. The URL for GENA at the Wireless Docking Host may be given in the Docking Host GENA URL Sub-element of the Docking IE during the device discovery 202. A GENA Subscribe Request message of the docking protocol may use the following format in some examples.

```
SUBSCRIBE [path] HTTP/1.1
HOST: [WDH GENA service URL]
CALLBACK: <Dockee URL>
NT: wdck:event
TIMEOUT: [requested subscription duration in seconds]
```

A GENA Subscribe Response message of the docking protocol may use the following format in some examples.

```
HTTP/1.1 200 OK
DATE: [when response was generated]
SID: [dockeeID:sessionID:subscriptionID]
CONTENT-LENGTH: 0
TIMEOUT: [actual subscription duration in seconds]
```

A GENA Unsubscribe Request message of the docking protocol may use the following format in some examples.

```
UNSUBSCRIBE [path] HTTP/1.1
HOST: [WDH GENA service URL]
SID: [dockeeID:sessionID:subscriptionID]
```

A GENA Unsubscribe Response message of the docking protocol may use the following format in some examples.
HTTP/1.1 200 OK A GENA Event Notification message of the docking protocol may use the following format in some examples. The elements to be included in a GENA Event Notification message of the docking protocol may be described in its corresponding docking protocol procedure in some examples:

```
NOTIFY [path] HTTP/1.0
HOST: [Dockee URL]
CONTENT-TYPE: text/xml; charset="utf-8"
NT: wdck:event
SID: [dockeeID:sessionID:subscriptionID]
SEQ: [event key]
CONTENT-LENGTH: [bytes in body]
<?xml version="1.0"?>
<eventNotification xmlns:xsi="http://www.w3.org/2001/
XMLSchema-instance" xsi:noNamespaceSchemaLocation=
"[WFA URL]/wdck-messages.xsd">
    [element content]
</eventNotification>
```

FIG. 4B is a conceptual diagram illustrating another example wireless docking communications protocol stack 401 in accordance with one or more examples of this disclosure that uses a binary protocol running on TCP/IP. As indicated in FIG. 4B, dockee 100 and docking center 120 may both send docking communications 414 over a binary docking protocol 407 running on TCP layer 404 and IP layer 402. The TCP/IP port may be specified in the wireless docking center control URL sub-element in the pre-association service discovery 242 of procedure 300. Binary docking protocol 407 may be used to communicate docking protocol messages using a common format, examples of which are shown in FIGS. 4C and 4D.

Figure 4C:
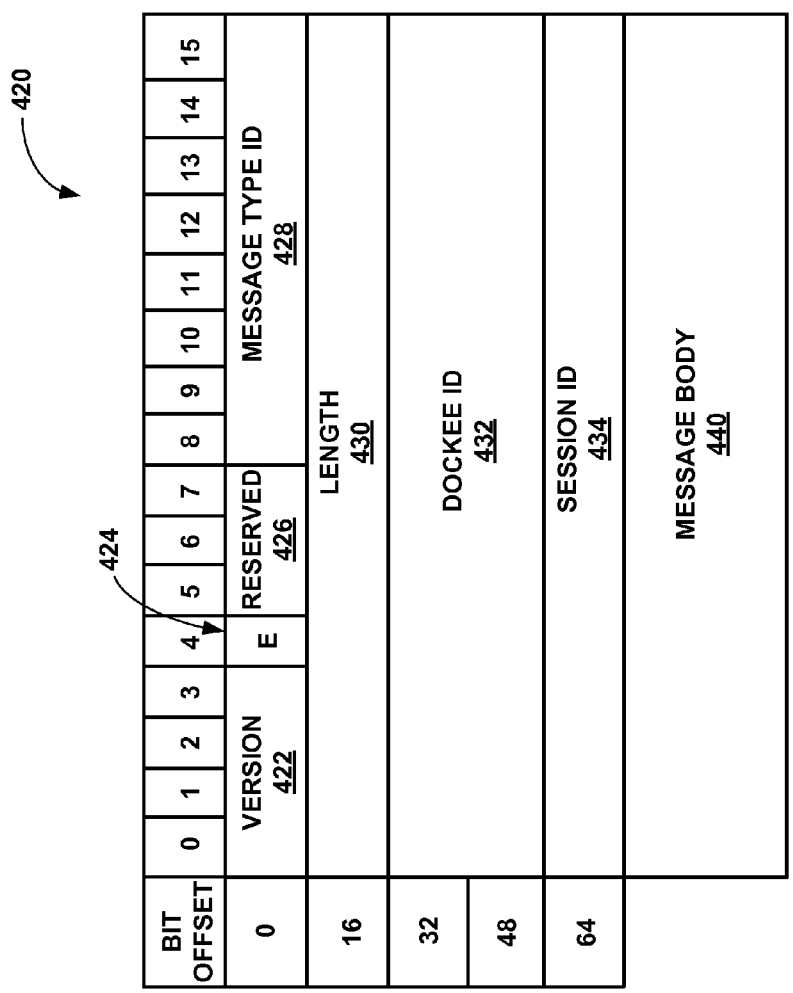
FIG. 4C is a conceptual diagram illustrating an example binary docking protocol message format in accordance with one or more examples of this disclosure.

FIG. 4C is a conceptual diagram illustrating an example binary docking protocol message format 420 in accordance with one or more examples of this disclosure. Binary docking protocol message format 420 as depicted in the example of FIG. 4C shows the bit fields of a binary packet header, with illustrative bit sizes and field positions. Other configurations may be used in other binary protocol format examples, with other field sizes and arrangements. The fields include a version field 422, an extension header flag (E) 424, a reserved field 426, a message type field 428, a length field 430, a dockee identifier (ID) field 432, a session identifier (ID) field 434, and a message body field 440.

Version field 422 (four bits in this example) indicates a version of the binary protocol, and may be set to 0b0000 in this example. Extension header flag (E) 424 (one bit in this example) may indicate whether an extension header is present, for example, by being set to 1 if and only if an extension header is present (an example of which is shown in FIG. 4D). The reserved field 426 (three bits in this example) may be reserved for future use, and may be set to zeros and ignored in the current example. The message type ID field 428 (eight bits in this example) may indicate a message type, examples of which are shown below in Table 10. The length field 430 (sixteen bits in this example) may indicate the length of the message body in bytes. The dockee ID field 432 (thirty-two bits in this example) may indicate the universally unique identifier (UUID) of the dockee 110. The session ID field 434 (sixteen bits in this example) may indicate the session identifier issued by the wireless docking center 120. When the session is not set up, this field may be set to 0x0000, which should then not be used for the session ID of an active docking session. The message body field 440 may include the body of the message.

FIG. 4D is a conceptual diagram illustrating another example binary docking protocol message format 421 in accordance with one or more examples of this disclosure. Binary docking protocol message format 421 is identical to binary docking protocol message format 420 in the example of FIG. 4C except for including two additional fields, namely an extension header length field 436 and an extension header field 438. If these fields are used, their presence may be indicated in extension header flag (E) field 424. The extension header length field 436 (sixteen bits in this example) may indicate the length of the extension header if the extension header is present. The extension header field 438 (also sixteen bits in this example) may contain the content of the extension header.

As indicated above, an example set of the docking protocol message types that may be included in the message type ID field 428 are listed below in Table 10. Message type ID's 10, 11, 14, and 15 refer to a WDN, i.e., a wireless data environment.

TABLE 10

Docking Protocol Message Type

| Message Type ID | Message Type |
|---|---|
| 0 | Session Setup Request |
| 1 | Session Setup Response |
| 2 | Peripheral Function Inquiry Request |
| 3 | Peripheral Function Inquiry Response |
| 4 | Peripheral Function Change Notification |
| 5 | Peripheral Function Selection Request |
| 6 | Peripheral Function Selection Response |
| 7 | Session Teardown Request |
| 8 | Session Teardown Response |
| 9 | Session Teardown Notification |
| 10 | Create Persistent WDN Request |
| 11 | Create Persistent WDN Response |
| 12 | Persistent Docking Request |
| 13 | Persistent Docking Response |
| 14 | Delete Persistent WDN Request |
| 15 | Delete Persistent WDN Request |
| 16-255 | Reserved |

Figure 5:
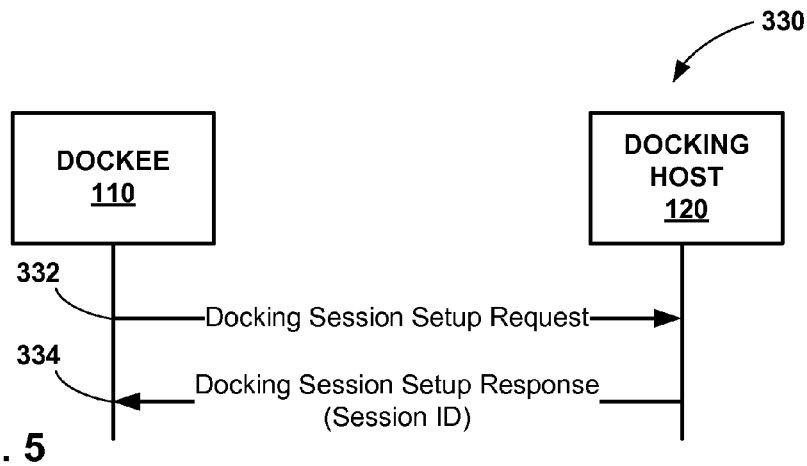
FIG. 5 is a communication diagram illustrating a communication flow for an example procedure for a dockee and a docking host to establish a docking session with each other, in accordance with one or more examples of this disclosure.

FIG. 5 is a communication diagram illustrating a communication flow for an example procedure 330 for a dockee 110 and a docking host 120 to establish a docking session with each other, in accordance with one or more examples of this disclosure. The procedure 330 for establishing a docking session may correspond to the docking session set-up procedure 330 as shown in FIG. 3, and provides for the initial set-up to start a docking environment between the dockee 110 and the docking host 120. The Docking Session Setup procedure 330 may be used by a dockee 110 to set up a docking management session. In this example, the dockee 110 sends the Docking Session Setup Request 332 to the docking host 120 for setting up the docking session. The Docking Session Setup Request 332 may include the universally unique identifier (UUID) of the dockee 110. In some examples using SOAP payloads, the Docking Session Setup Request 332 may include a SOAP body with the following XML element in some examples:

```
<xs:element name="sessionSetupRequest">
    <xs:complexType>
        <xs:sequence>
            <xs:element name="dockeeID" type="xs:unsignedLong"/>
        </xs:sequence>
    </xs:complexType>
</xs:element>
```

Throughout this disclosure, requests and responses that include a SOAP body may be considered SOAP payloads. The docking host 120 sends the Docking Session Setup Response 334 to the dockee 110 to confirm the status of the docking session set up. The Docking Session Setup Response 334 may include a unique Docking Session ID. In some examples, the Docking Session Setup Response 334 may include a SOAP body that may include or consist of the following XML element in some examples:

```
<xs:element name="sessionSetupResponse">
    <xs:complexType>
        <xs:sequence>
            <xs:element name="dockeeID"
                type="xs:unsignedLong"/>
            <xs:element name="sessionID"
                type="xs:unsignedLong"/>
                <xs:annotation>
                    <xs:documentation>a unique docking session
ID</xs:documentation>
                </xs:annotation>
        </xs:sequence>
    </xs:complexType>
</xs:element>
```

In other examples of docking session setup procedure 330 using a binary protocol, wireless dockee 110 may send a session setup request 332 in which the message body 440 is empty, and the session ID field 434 is set to 0x0000. The wireless docking center 120 may respond by sending docking setup response 334 to dockee 110 to confirm the status of the docking session setup.

Figure 6:
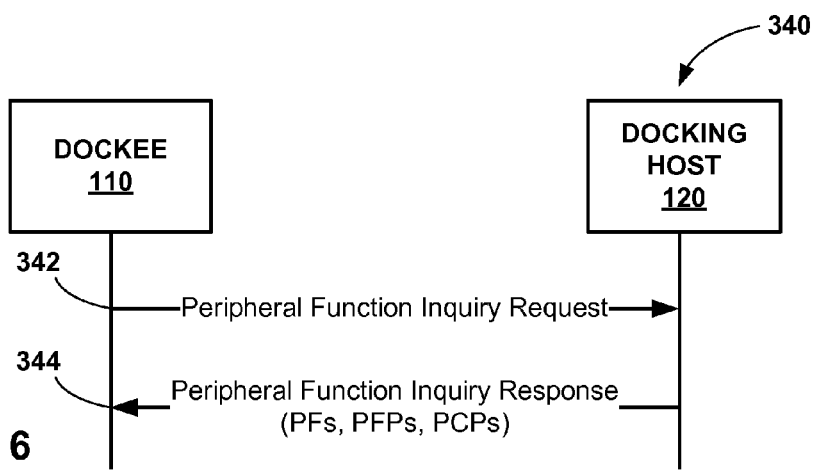
FIG. 6 is a communication diagram illustrating a communication flow for an example procedure for a dockee and a docking host to exchange peripheral function inquiry information with each other, in accordance with one or more examples of this disclosure.

FIG. 6 is a communication diagram illustrating a communication flow for an example procedure 340 for a dockee 110 and a docking host 120 to exchange peripheral function inquiry information with each other, in accordance with one or more examples of this disclosure. The procedure 340 for exchanging peripheral function inquiry information may correspond to the peripheral function inquiry procedure 340 as shown in FIG. 3. Peripheral function inquiry procedure 340 differs from peripheral function discovery that may take place as part of pre-association service discovery 242. For example, peripheral function inquiry procedure 340 takes place in a secure transaction in a transport layer protocol such as TCP, rather than in layer 2 communications, and after authentication of a docking session between dockee 110 and docking host 120, such that docking host 120 may apply any permissions needed for the peripheral functions based on the authentication, in some examples.

The peripheral function inquiry procedure 340 may be used by a dockee 110 to retrieve peripheral function information of peripherals hosted by the docking host 120. In the example of FIG. 6, the wireless dockee 110 sends the Peripheral Function Inquiry Request 342 to the Wireless Docking Host 120 to request the peripheral function information. The Peripheral Function Inquiry Request 342 may include the UUID of the wireless dockee 110, and a docking session ID. The Peripheral Function Inquiry Request 342 may include a SOAP body that may include or consist of the following XML element in some examples:

```
<xs:element name="peripheralInquiryRequest">
    <xs:complexType>
        <xs:sequence>
            <xs:element name="dockeeID" type="xs:unsignedLong"/>
            <xs:element name="sessionID" type="xs:unsignedLong"/>
        </xs:sequence>
    </xs:complexType>
</xs:element>
```

The Wireless Docking Host 120 may send the Peripheral Function Inquiry Response 344 to the Wireless Dockee 110 in response to Peripheral Function Inquiry Request 342 to provide peripheral function information. The Peripheral Function Inquiry Response 344 may include an array of peripheral functions. For each peripheral function, Peripheral Function Inquiry Response 344 may include a list of peripheral function protocols and a list of payload connection protocols that can be used to support the use of the peripheral function. The Peripheral Function Inquiry Response 344 may include a SOAP body that may include or consist of the following XML element in some examples:

```
<xs:element name="peripheralInquiryResponse">
    <xs:complexType>
        <xs:sequence>
            <xs:element name="dockeeID" type=
            "xs:unsignedLong"/>
            <xs:element name="sessionID" type=
            "xs:unsignedLong"/>
            <xs:element name="peripheralFunction"
maxOccurs="unbounded">
                <xs:complexType>
                    <xs:sequence>
                        <xs:element name="peripheralFunctionID"
type="xs:unsignedLong"/>
                        <xs:element name=
"peripheralFunctionType" type="peripheralFunctionType"/>
                        <xs:element name=
"peripheralFunctionProtocol" type="peripheralFunctionProtocol"
maxOccurs="unbounded"/>
                        <xs:element name=
"payloadConnectionType" type="payloadConnectionType"
maxOccurs="unbounded"/>
                        <xs:element name="description"
type="xs:string"/>
                        <xs:element name="available"
type="xs:boolean"/>
                    </xs:sequence>
                </xs:complexType>
            </xs:element>
        </xs:sequence>
    </xs:complexType>
</xs:element>
```

The XML types peripheralFunctionType, peripheralFunctionProtocol and payloadConnectionType used by the element peripheralFunction in the XML element above for Peripheral Function Inquiry Response 344 may be defined as follows, in some examples:

```
<xs:simpleType name="peripheralFunctionType">
    <xs:restriction base="xs:string">
        <xs:enumeration value="mouse"/>
        <xs:enumeration value="keyboard"/>
        <xs:enumeration value="remoteControl"/>
        <xs:enumeration value="display"/>
        <xs:enumeration value="speaker"/>
        <xs:enumeration value="microphone"/>
        <xs:enumeration value="storage"/>
        <xs:enumeration value="joystick"/>
        <xs:enumeration value="wirelesscharger"/>
    </xs:restriction>
</xs:simpleType>
<xs:simpleType name="peripheralFunctionProtocol">
    <xs:restriction base="xs:string">
        <xs:enumeration value="miracast"/>
        <xs:enumeration value="wsb"/>
        <xs:enumeration value="bluetooth"/>
        <xs:enumeration value="wde"/>
        <xs:enumeration value="wse"/>
    </xs:restriction>
</xs:simpleType>
<xs:simpleType name="payloadConnectionType">
    <xs:restriction base="xs:string">
        <xs:enumeration value="11n"/>
        <xs:enumeration value="11ac"/>
        <xs:enumeration value="11ad"/>
    </xs:restriction>
</xs:simpleType>
```

In other examples of peripheral function inquiry procedure 340 using a binary protocol, wireless dockee 110 may send a peripheral function inquiry request 342 in which the message body 440 is empty. The wireless docking center 120 may respond, in this example, by sending a peripheral function inquiry response 344 to dockee 110 with peripheral function information as listed below in Table 11.

TABLE 11

Peripheral Function Inquiry Response

| Field | Length (Octets) | Type |
|---|---|---|
| n_PFs | 1 | uimsbf |
| for (i = 0; i < n_PFs; i++) { | | |
|     PF_ID | 2 | uimsbf |
|     PF_type | 2 | uimsbf |
|     PF_name | Variable | UTF-8_String( ) |
|     PF_capability | Variable | UTF-8_String( ) |
|     PF_state | 1 | uimsbf |
|     n_PFPs | 1 | uimsbf |
|     for (i = 0; i < n_PFPs; i++) { | | |
|         PFP_ID | 1 | uimsbf |
|     } | | |
|     n_PCTs | 1 | uimsbf |
|     for (i = 0; i < n_PCTs; i++) { | | |
|         PCT_ID | 1 | uimsbf |
|     } | | |
| } | | |

In Table 11, some of the fields may provide information similar to the fields described above with reference to Table 4. Additionally, in this example, the peripheral function inquiry response fields as listed in Table 11 may include n_PCTs; this field may contain a number of payload connection types that can be used to support a peripheral function. The field PCT_ID in this example may contain the identifier of a payload connection type, making reference to different sections of IEEE 802.11 (e.g., 802.11n, 802.11ac, 802.11ad), as provided below in Table 12.

TABLE 12

Payload Connection Type (PCT)

| PCT ID | Description |
|---|---|
| 0 | 11n |
| 1 | 11ac |
| 2 | 11ad |
| 3-255 | Reserved |

Figure 7:
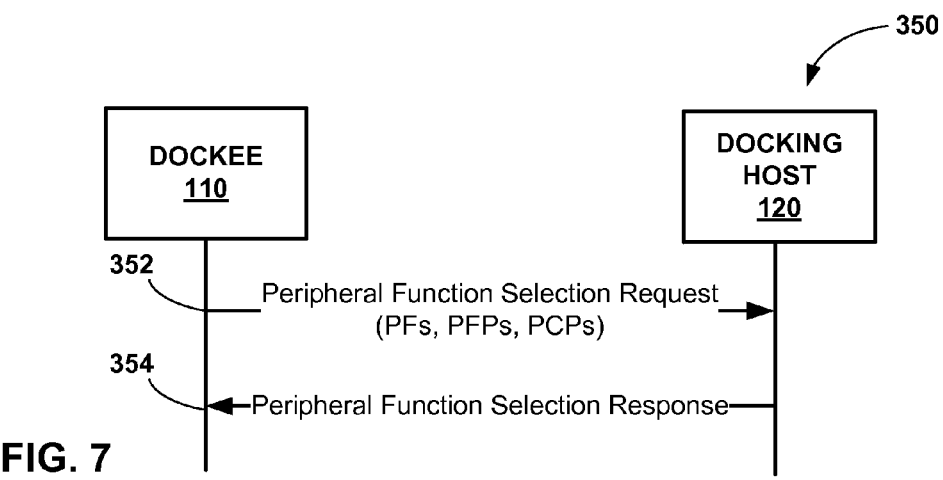
FIG. 7 is a communication diagram illustrating a communication flow for an example procedure for a dockee and a docking host to exchange peripheral function selection information with each other, in accordance with one or more examples of this disclosure.

FIG. 7 is a communication diagram illustrating a communication flow for an example procedure 350 for a dockee and a docking host to exchange peripheral function selection information with each other, in accordance with one or more examples of this disclosure. The procedure 350 for exchanging peripheral function selection information may correspond to the peripheral function selection procedure 350 as shown in FIG. 3. The peripheral function selection procedure 350 may be used by a dockee 110 to select peripheral functions to make use of, during the wireless docking session, from peripherals hosted by the docking host 120. In the example of FIG. 7, the wireless dockee 110 sends the Peripheral Function Selection Request 352 to the Wireless Docking Host 120 to indicate one or more selections of peripheral functions. The Peripheral Function Selection Request 352 may include a list of one or more peripheral functions for dockee 110 to use. The Peripheral Function Selection Request 352 may include, for each selected peripheral function, the peripheral function protocol and the payload connection protocol that can be used to support the use of the corresponding selected peripheral functions. In an example using SOAP and GENA payloads, Peripheral Function Selection Request 352 may include a SOAP body that may include or consist of the following XML element in some examples:

```
<xs:element name="peripheralInquiryResponse">
    <xs:complexType>
        <xs:sequence>
            <xs:element name="dockeeID"
                type="xs:unsignedLong"/>
            <xs:element name="sessionID"
                type="xs:unsignedLong"/>
            <xs:element name="peripheralFunction"
maxOccurs="unbounded">
                <xs:complexType>
                    <xs:sequence>
                        <xs:element name="peripheralFunctionID"
type="xs:unsignedLong"/>
                        <xs:element name=
"peripheralFunctionProtocol" type="peripheralFunctionProtocol"/>
                        <xs:element name=
"payloadConnectionType" type="payloadConnectionType"/>
                        <xs:element name="required"
type="xs:boolean"/>
                    </xs:sequence>
                </xs:complexType>
            </xs:element>
        </xs:sequence>
    </xs:complexType>
</xs:element>
```

The Wireless Docking Host 120 may send the Peripheral Function Selection Response 354 to the Wireless Dockee 110 to provide information needed to establish the payload connection for the corresponding peripheral function protocols. The Peripheral Function Selection Response 354 may include a SOAP body that may include or consist of the following XML element in some examples:

```
<xs:element name="peripheralSelectionResponse">
    <xs:complexType>
        <xs:sequence>
            <xs:element name="dockeeID"
                type="xs:unsignedLong"/>
            <xs:element name="sessionID"
                type="xs:unsignedLong"/>
            <xs:element name="accepted" type="xs:boolean"/>
            <xs:element name="peripheralFunction"
minOccurs="0" maxOccurs="unbounded">
                <xs:complexType>
                    <xs:sequence>
                        <xs:element name="peripheralFunctionID"
```

-continued

```
type="xs:unsignedLong"/>
                        <xs:element name=
"peripheralFunctionProtocol" type="peripheralFunctionProtocol"/>
                        <xs:element name=
"payloadConnectionType" type="payloadConnectionType"/>
                    </xs:sequence>
                </xs:complexType>
            </xs:element>
        </xs:sequence>
    </xs:complexType>
</xs:element>
```

In other examples of peripheral function selection procedure 350 using a binary protocol, wireless dockee 110 may send a peripheral function selection request 352 in which the message body 440 contains peripheral function selection information as listed below in Table 13. The wireless docking center 120 may respond, in this example, by sending a peripheral function selection response 354 to dockee 110 with peripheral function selection information as listed further below in Table 14.

TABLE 13

| Peripheral Function Selection Request | | |
| --- | --- | --- |
| Field | Length (Octets) | Type |
| n_PFs | 1 | uimsbf |
| for (i = 0; i < n_PFs; i++) { | | |
|     PF_ID | 2 | uimsbf |
|     PFP_ID | 1 | uimsbf |
|     PCT_ID | 1 | uimsbf |
|     required | 1 | boolean |
| } | | |

In the peripheral function selection request, the "required" field indicates whether a particular peripheral function is a must-have for a docking session. The field may be set to 0x00 if and only if this particular peripheral function is required for the docking session.

The wireless docking center 120 may send the peripheral function selection response 354 to the wireless dockee 110 to provide information needed to establish the payload connection for its corresponding peripheral function protocols, with peripheral function selection response in a message body 440 as indicated below in Table 14.

TABLE 14

| Peripheral Function Selection Response | | |
| --- | --- | --- |
| Field | Length (Octets) | Type |
| accepted | 1 | boolean |
| n_PFs | 1 | uimsbf |
| for (i = 0; i < n_PFs; i++) { | | |
|     PF_ID | 2 | uimsbf |
|     PFP_ID | 1 | uimsbf |
|     PCT_ID | 1 | uimsbf |
| } | | |

In the peripheral function selection response, the "accepted" field indicates whether the request for a docking session is accepted. The wireless docking center 120 may then provide the peripheral functions listed in the response 354 to the dockee 110 for the docking session.

Figure 8:
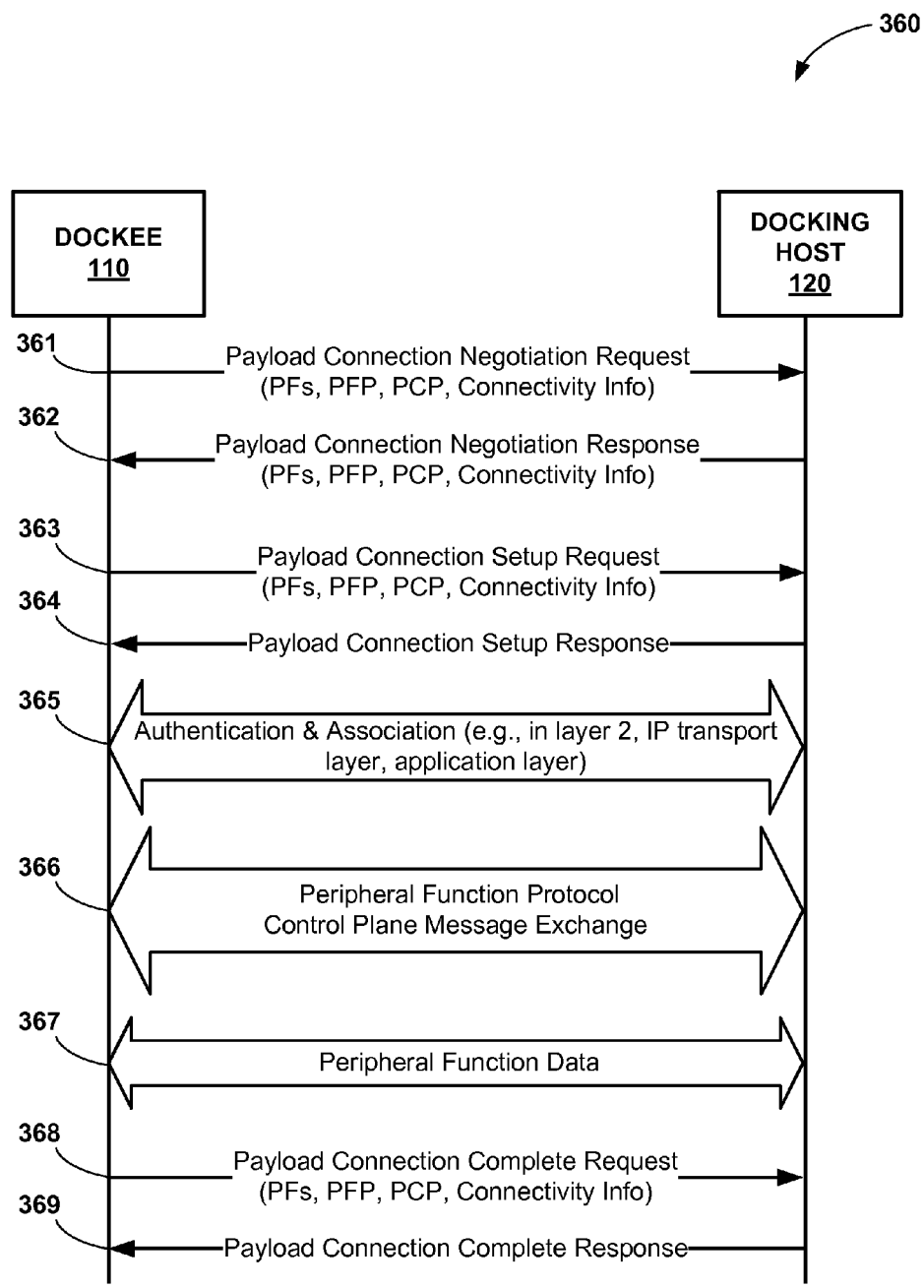
FIG. 8 is a communication diagram illustrating a communication flow for an example procedure for a dockee and a docking host to exchange payload connection setup information with each other, in accordance with one or more examples of this disclosure.

FIG. 8 is a communication diagram illustrating a communication flow for an example procedure 360 for a dockee 110 and a docking host 120 to exchange payload connection setup information with each other, in accordance with one or more examples of this disclosure. The procedure 360 for exchanging payload connection setup information may correspond to the payload connection setup procedure 360 as shown in FIG. 3. The payload connection setup procedure 360 may be used by a dockee 110 to establish one or more payload connections, during the wireless docking session, to convey data between dockee 110 and the peripherals hosted by the docking host 120. One or more aspects of the payload connection setup procedure 360 may need to be repeated until payload connections for all intended peripherals are set up. The payload connection Setup procedure 360 can be divided into separate stages, including payload connection negotiation request 361 and response 362; payload connection setup request 363 and response 364; payload connection setup, including authentication and association 365, peripheral function protocol control plane message exchange 366, and peripheral function data 367; and payload connection complete request 368 and response 369. Some aspects of payload connection setup procedure 360 may involve usage of or other association with an established payload connection rather than setting up or establishing the payload connection, such as exchanges of peripheral data 367 within an established payload connection.

In the example of FIG. 8, the wireless dockee 110 may send a payload connection negotiation request 361 to the wireless docking host 120, and the wireless docking host 120 may respond by sending a payload connection negotiation response 362 to the wireless dockee 110. The payload connection negotiation request 361 and payload connection negotiation response 362 may each include information on one or more of peripheral functions (PF's), peripheral function protocols (PFP), peripheral connection payloads (PCP), and connectivity. The wireless dockee 110 may then send a payload connection setup request 363 to the wireless docking host 120, and the wireless docking host 120 may respond by sending a payload connection setup response 364 to the wireless dockee 110. At least the payload connection setup request 363 may also include PF, PFP, PCP, and connectivity information.

Some additional details regarding the payload connection negotiation request 361, payload connection negotiation response 362, payload connection setup request 363, and payload connection setup response 364 in some examples are provided as follows. The payload connection negotiation request 361 may include the following information: payload connection protocol; connectivity configuration information of the payload connection requested by the dockee 110; peripheral function protocol; and peripheral functions that use the payload connection protocol and the payload function protocol. In the case of setting up a Wi-Fi peer-to-peer (P2P) connection without a persistent P2P group, the connectivity configuration information may include: group owner intent, operating channel, intended P2P interface address, channel list, P2P group ID, and P2P group credential. In the case of setting up a Wi-Fi P2P connection with a persistent P2P group, the connectivity configuration information may include: operating channel, P2P group basic service set identification (BSSID), channel list, and P2P group ID.

The payload connection negotiation response 362 may include the following information: payload connection protocol; connectivity configuration information of the payload connection requested by the docking host 120; peripheral function protocol; and peripheral functions that use the payload connection protocol and the payload function protocol. In the case of setting up a Wi-Fi P2P connection without a persistent P2P group, the connectivity information may include: group owner intent, operating channel, intended P2P interface address, channel list, P2P group ID, and P2P group credential. In the case of setting up a Wi-Fi P2P connection with a persistent P2P group, the connectivity information may include: operating channel, P2P group BSSID, and channel list.

The payload connection setup request 363 may include the following information: payload connection protocol; connectivity configuration information of the payload connection as agreed by both the dockee 110 and the docking host 120; peripheral function protocol; and peripheral functions that use the payload connection protocol and the payload function protocol. In the case of setting up a Wi-Fi P2P connection without a persistent P2P group, the connectivity information may include: operating channel, channel list, and P2P group ID. In the case of setting up a Wi-Fi P2P connection with a persistent P2P group, the connectivity information may include: operating channel, P2P group BSSID, and channel list.

The docking host 120 may send the payload connection setup response 364 to confirm that the setup information been accepted. After the Payload Connection Setup request 363 and response 364, both the dockee 110 and the docking host 120 may proceed to payload connection setup, which may include a process to find each other on a common channel and connect to each other based on the connectivity configuration information prescribed for the payload connection. This may include the dockee 110 and the docking host 120 exchanging a new set of authentication and association 365 specific to the payload connection, which may be done over layer 2 ("L2") communications, IP transport layer communications (e.g., TCP/IP), application layer communications (e.g., HTTP), or other communications in various examples.

After the payload connection setup, the dockee 110 may send the payload connection complete request 368 to the docking host 120. The docking host 120 may send the payload connection complete response 369 after docking host 120 has received payload connection complete request 368 to signal that the peripheral functions corresponding to the payload connection are now in use by the dockee 110.

In some examples, the payload connection for one or more peripherals may comprise a Wi-Fi Display (WFD) connection. The payload connection setup for WFD may take place after the Peripheral Function Selection procedure 350, if WFD is selected and agreed to be the peripheral function protocol of a peripheral function that is a WFD sink device. Similarly, in some examples, the payload connection for one or more peripherals may be a Wi-Fi Serial Bus (WSB) connection. The payload connection setup for WSB may take place after the Peripheral Function Selection procedure 350, if WSB is selected and agreed to be the peripheral function protocol of a peripheral function that is a WSB device.

Figure 9:
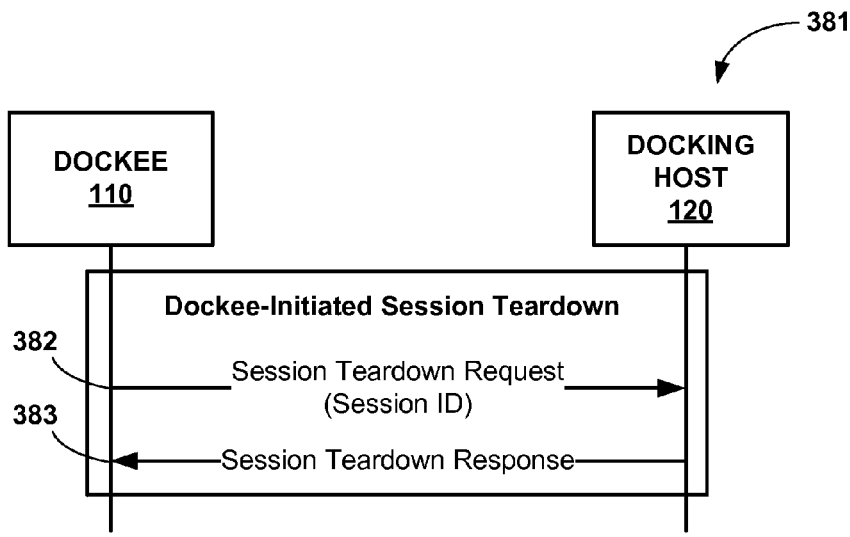
FIG. 9 is a communication diagram illustrating a communication flow for an example procedure for a dockee and a docking host to exchange dockee-initiated docking session teardown information with each other, in accordance with one or more examples of this disclosure.
Figure 10:
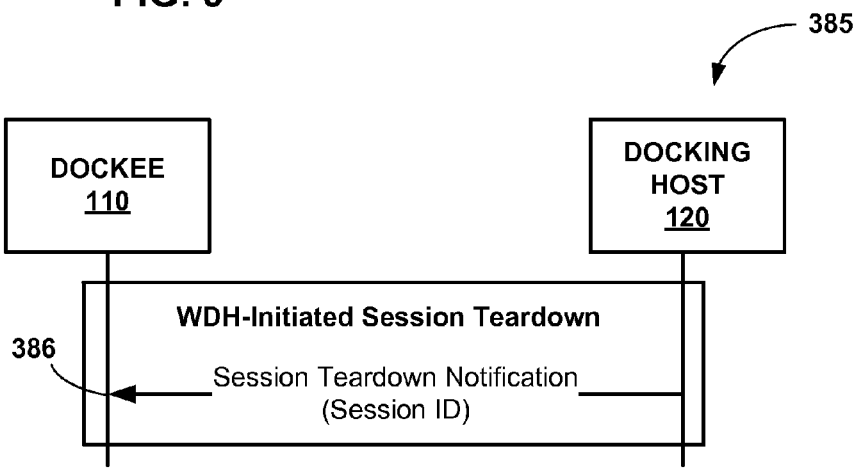
FIG. 10 is a communication diagram illustrating a communication flow for an example procedure for a docking host to send docking host-initiated docking session teardown information to a dockee, in accordance with one or more examples of this disclosure.

Either the dockee 110 or the docking host 120 may initiate a teardown of a wireless docking session to terminate the docking session. FIGS. 9 and 10 show communication flows for different examples of a docking session teardown procedure, whether initiated by the dockee 110 or the docking host 120.

FIG. 9 is a communication diagram illustrating a communication flow for an example procedure 381 initiated by a dockee 110 for a dockee 110 and a docking host 120 to exchange docking session teardown information with each other, in accordance with one or more examples of this disclosure. The procedure 360 for exchanging docking session teardown information may correspond to the docking session teardown procedure 380 as shown in FIG. 3. The docking session teardown procedure 380 may be used by a dockee 110 to terminate a wireless docking session.

In the example of FIG. 9, the wireless dockee 110 sends a session teardown request 382 to the wireless docking host 120. The session teardown request 382 may include the Session ID. In examples using SOAP and GENA payloads, the session teardown request 382 sent by the dockee 110 may include a SOAP body that may include or consist of the following XML element in some examples:

```
<xs:element name="sessionTeardownRequest">
    <xs:complexType>
        <xs:sequence>
            <xs:element name="dockeeID" type="xs:unsignedLong"/>
            <xs:element name="sessionID" type="xs:unsignedLong"/>
        </xs:sequence>
    </xs:complexType>
</xs:element>
```

The session teardown response 383 sent by the wireless docking host 120 may include a SOAP body that may include or consist of the following XML element in some examples:

```
<xs:element name="sessionTeardownResponse">
    <xs:complexType>
        <xs:sequence>
            <xs:element name="dockeeID" type="xs:unsignedLong"/>
            <xs:element name="sessionID" type="xs:unsignedLong"/>
        </xs:sequence>
    </xs:complexType>
</xs:element>
```

In other examples based on a binary protocol, dockee 110 may send a session teardown request 382 with an empty message body, and the wireless docking center 120 may respond with a session teardown response 384 that also has an empty message body.

FIG. 10 is a communication diagram illustrating a communication flow for an example procedure 385 initiated by a docking host 120 for a docking host 120 to send docking session teardown information to a wireless dockee 110, in accordance with one or more examples of this disclosure. The procedure 385 for docking host 120 to send docking session teardown information may also correspond to another example of the docking session teardown procedure 380 as shown in FIG. 3. The docking session teardown procedure 385 may be used by a docking host 120 to terminate a wireless docking session. Wireless docking host 120 may terminate a docking session with dockee 110 unilaterally, in this example.

In the example of FIG. 10, the wireless docking host 120 sends a session teardown notification 386 to the wireless dockee 110. The session teardown notification 386 may include the Session ID. In examples using SOAP and GENA payloads, the session teardown notification 386 may include or take the form of a GENA event, since it is simply a notification, in this example. The Session Teardown Notification GENA event may include a DockingHostNotification element that may include or consist of the following XML element in some examples:

```
<xs:element name="sessionTeardownNotif" minOccurs="0" >
    <xs:complexType>
        <xs:attribute name="dockeeID" type="xs:unsignedLong"/>
        <xs:attribute name="sessionID" type="xs:unsignedLong"/>
    </xs:complexType>
</xs:element>
```

In other examples based on a binary protocol, the wireless docking center 120 may send a session teardown notification 386 that simply has an empty message body.

Figure 11:
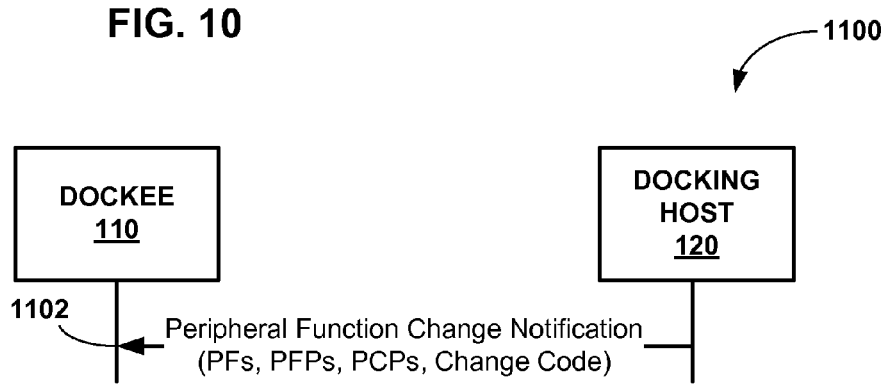
FIG. 11 is a communication diagram illustrating a communication flow for an example procedure for a docking host to send docking peripheral function change notification information to a dockee, in accordance with one or more examples of this disclosure.

FIG. 11 is a communication diagram illustrating a communication flow for an example procedure 1100 for a wireless docking host 120 to send peripheral function change information to a wireless dockee 110, in accordance with one or more examples of this disclosure. The peripheral function change notification procedure 1100 may be used by a wireless docking host 120 to inform a wireless dockee 110 of new changes in peripheral functions available via wireless docking host 120 in the wireless docking session, in the form of addition, removal, or state change of peripherals hosted by the docking host 120.

Wireless docking host 120 may use peripheral function change notification procedure 1100 in the event that wireless docking host 120 detects a new change in the peripheral functions available via wireless docking host 120, such as by receiving communication from a peripheral device that is newly added to the peripheral devices available to wireless docking host 120. A peripheral device may be made newly available to wireless docking host by being wirelessly hot-plugged into wireless docking host 120 during one or more existing wireless docking sessions, for example. In some examples, a newly hot-plugged peripheral device may be added to the docking environment of wireless docking host 120 over a Wi-Fi Serial Bus (WSB) connection, for example. Wireless docking host 120 may also use peripheral function change notification procedure 1100 in the event that wireless docking host 120 loses communication with an existing peripheral device, for example.

In the example of FIG. 11, the wireless docking host 120 sends a peripheral function change notification 1102 to the wireless dockee 110, thereby sending a notice of the new change in the available peripheral functions to the wireless dockee 110, in this example. The peripheral function change notification 1102 may include information on peripheral functions (PF), peripheral function protocols (PFP), peripheral connection payloads (PCP), and/or one or more peripheral function change codes, for example. In examples using SOAP and GENA payloads, the peripheral function change notification 1102 may include or take the form of a GENA event, since it is simply a notification, in this example. The peripheral function change notification GENA event may include or consist of the following XML element in some examples:

```
<xs:element name="peripheralFunctionChangeNotif">
    <xs:complexType>
        <xs:sequence>
            <xs:element name="peripheralFunction" maxOccurs="unbounded">
                <xs:complexType>
                    <xs:sequence>
                        <xs:element name="peripheralFunctionID" type="xs:unsignedLong"/>
                        <xs:element name="peripheralFunctionType" type="peripheralFunctionType"/>
                        <xs:element name="peripheralFunctionProtocol" type="peripheralFunctionProtocol" maxOccurs="unbounded"/>
                        <xs:element name="payloadConnectionType" type="payloadConnectionType" maxOccurs="unbounded"/>
                        <xs:element name="description" type="xs:string"/>
                        <xs:element name="available" type="xs:boolean"/>
                    </xs:sequence>
```

-continued

```
        </xs:complexType>
      </xs:element>
    </xs:sequence>
    <xs:attribute name="dockeeID" type="xs:unsignedLong"/>
    <xs:attribute name="sessionID" type="xs:unsignedLong"/>
    <xs:attribute name="changeCode"
      type="peripheralChangeCode"/>
    </xs:complexType>
</xs:element>
```

The peripheral function change code that may be included in a peripheral function change notification 1102 may include a GENA event that includes an XML type peripheralChangeCode used by the element peripheralFunction, and may include or consist of the following XML element in some examples:

```
<xs:simpleType name="peripheralChangeCode">
  <xs:restriction base="xs:string">
    <xs:enumeration value="addition"/>
    <xs:enumeration value="removal"/>
    <xs:enumeration value="statusChange"/>
  </xs:restriction>
</xs:simpleType>
```

In the case of a Universal Serial Bus (USB) peripheral device being plugged into a device in the docking environment of wireless docking host 120 and coupled to wireless docking host 120 over a Wi-Fi Serial Bus (WSB) connection, the wireless docking host 120 may control the enumeration process for the newly plugged USB device at the dockee 110. The WSB connection may be mediated by a WSB hub module. When the WSB hub module detects and enumerates a newly plugged USB device, the WSB hub module may inform the wireless docking host 120 of the detection and the necessary description information of the USB device. The wireless docking host 120 may then send a command locally to the WSB hub module to suspend sending a USB device detection signal to a WSB host at the dockee 110. The wireless docking host 120 may subsequently advertise the newly plugged USB device and its description to its dockee 110 and wait for the dockee 110 to select the newly plugged USB device for its own use. If a dockee 110 selects the newly plugged USB device for its own use, the wireless docking host 120 may send a command locally to the WSB hub module to resume sending a USB device detection signal to the WSB host at the dockee 110.

Figure 12:
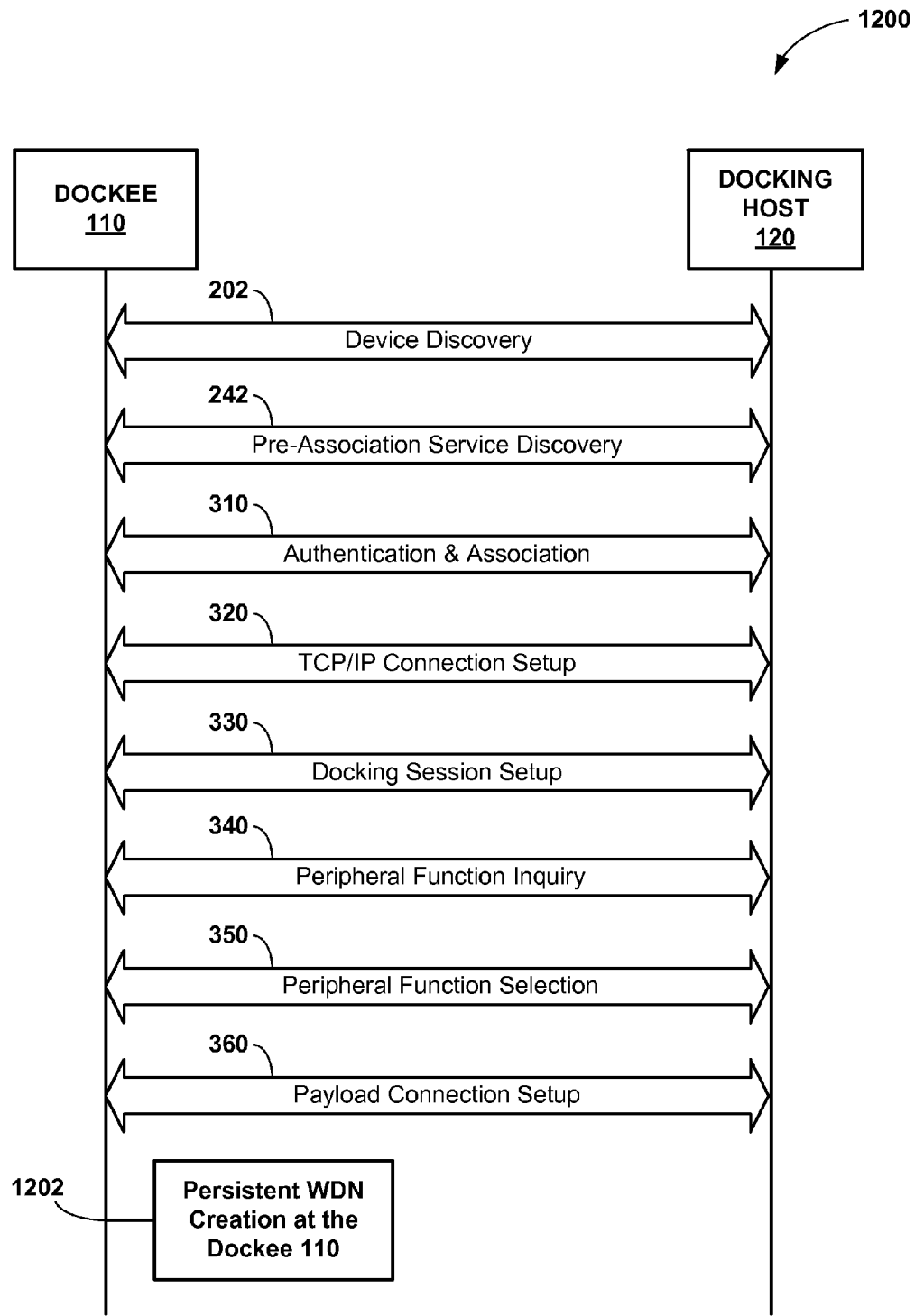
FIG. 12 is a communication diagram illustrating a communication flow for an example procedure between a dockee and a docking host to establish and operate a dockee-centric wireless docking session with each other, with the dockee creating a persistent wireless docking environment, in accordance with some examples of this disclosure.
Figure 13:
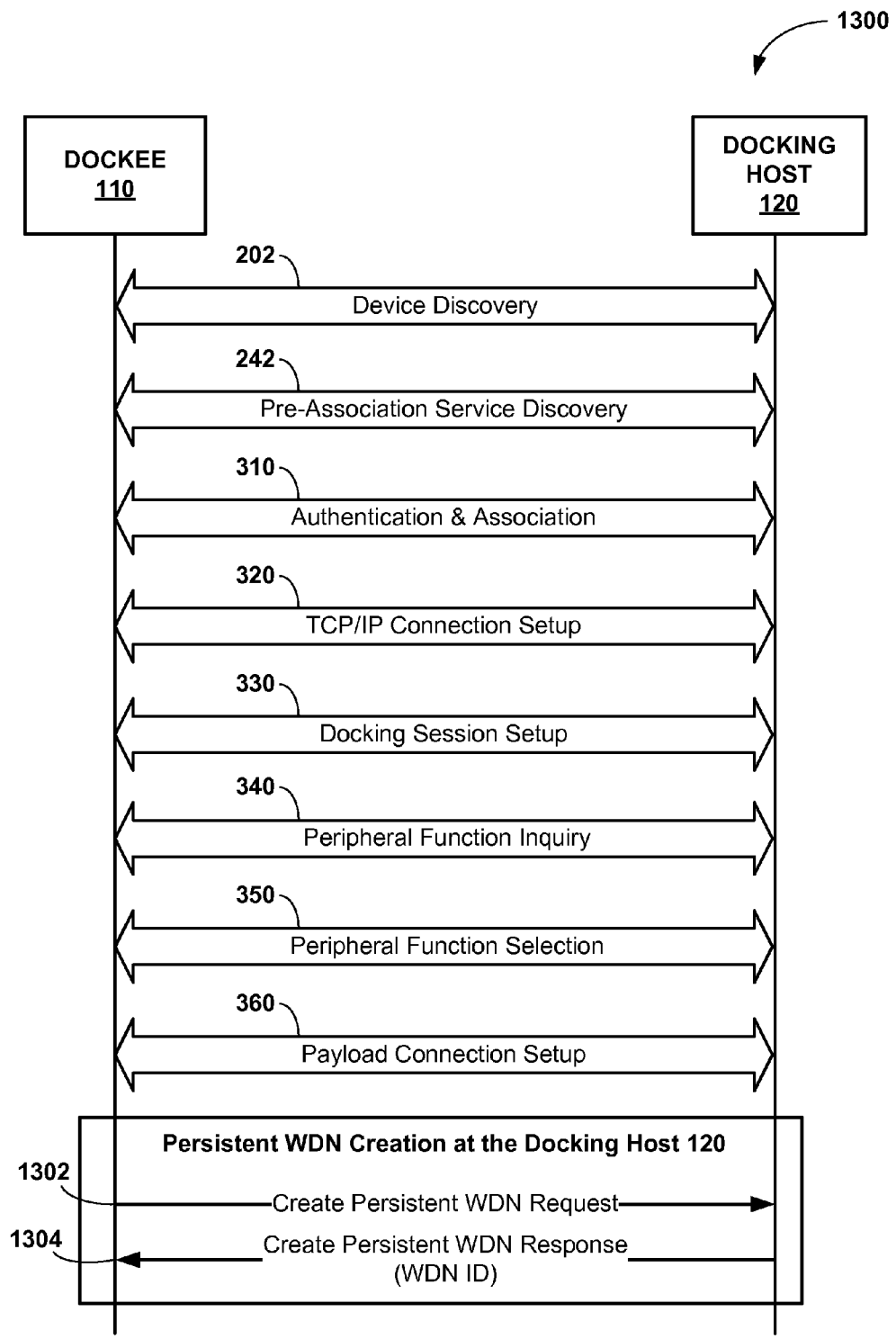
FIG. 13 is a communication diagram illustrating a communication flow for an example procedure between a dockee and a docking host to establish and operate a dockee-centric wireless docking session with each other, and to exchange information to create a persistent wireless docking environment for the dockee at the wireless docking host, in accordance with some examples of this disclosure.

As described in greater detail below, this disclosure also describes wireless communication techniques, protocols, methods, and devices applicable to a docking system environment in which a wireless dockee or a wireless docking host may create and/or store a persistent wireless data environment (WDN). The creation and/or storage of a persistent WDN may also be done in combination with dockee-centric docking protocols such as those discussed above. The WDN may be considered persistent in that dockee 110 or docking host 120 may store a WDN, or the configuration data for the selected one or more peripheral functions of a WDN, to persist after the current docking session, and available to be applied in establishing subsequent docking sessions with each other, in some examples. Different examples of a persistent WDN creation procedure are shown in FIGS. 12 and 13.

In other examples of peripheral function change notification procedure 1100 using a binary protocol, wireless dockee 110 may send a peripheral function change notification 1102 to the wireless dockee 110 in which the message body 440 of the binary message contains peripheral function notification information as listed below in Table 15.

TABLE 15

Peripheral Function Change Notification

| Field | Length (Octets) | Type |
|---|---|---|
| n_PFs | 1 | uimsbf |
| for (i = 0; i < n_PFs; i++) { | | |
|     PF_ID | 2 | uimsbf |
|     PF_type | 2 | uimsbf |
|     PF_name | Variable | UTF-8_String( ) |
|     PF_capability | Variable | UTF-8_String( ) |
|     PF_state | 1 | uimsbf |
|     n_PFPs | 1 | uimsbf |
|     for (i = 0; i < n_PFPs; i++) { | | |
|         PFP_ID | 1 | uimsbf |
|     } | | |
|     change_code | 1 | uimsbf |
| } | | |

In the peripheral function change notification message body, the "change_code" field indicates a change code of the peripheral function, which may be selected from among those listed below in Table 16.

TABLE 16

Peripheral Function Change Code

| change_code | Description |
|---|---|
| 0 | Addition |
| 1 | Removal |
| 2 | State Change |
| 3-255 | Reserved |

FIG. 12 is a communication diagram illustrating a communication flow for an example procedure 1200 between a wireless dockee 110 and a wireless docking host 120 to establish and operate a dockee-centric wireless docking session with each other, with the dockee creating a persistent wireless docking environment, in accordance with some examples of this disclosure. The procedure 1200 for establishing and operating a wireless docking session may correspond in many aspects to the wireless docking session procedure 300 as shown in FIG. 3, including the component procedures 202, 242, 310, 320, 330, 340, 350, and 360, as shown in both FIGS. 3 and 12. In one example, wireless docking session procedure 1200 in FIG. 12 differs in that, after payload connection setup 360, the wireless dockee 110 may create a persistent wireless data environment (WDN), locally at the wireless dockee 110. The wireless dockee 110 therefore may not need to send or receive any communications to create a persistent WDN; wireless dockee 110 may merely create the persistent WDN locally and store the configuration data for the persistent WDN locally, in this example.

Wireless dockee 110 may create the persistent WDN for its own future use, which may include simplifying and quickening the process of establishing and operating future wireless docking sessions between dockee 110 and wireless docking host 120, for example. The WDN configuration data may include the peripheral functions (PF) used in a particular wireless docking session, and the peripheral function protocol (PFP) and payload connection protocol (PCP) information for each peripheral function. A persistent P2P group may be associated with a persistent WDN, although a persistent WDN is not necessarily associated with a persistent P2P group, in some examples.

In some examples, the wireless docking host 120 may store a persistent wireless data environment (WDN) for the future use of the particular wireless dockee 110. During the pre-association service discovery procedure 242, wireless docking host 120 may include a docking information element (IE) in service discovery response 206 that may include a wireless docking (WDCK) capability sub-element. Wireless docking host 120 may set its WDCK capability sub-element in part to indicate that it has the capability to store a persistent WDN for the future use of the dockee 110. If the wireless docking host 120 has the capability to store a persistent WDN, then dockee 110 may initiate a transaction to store the persistent WDN at the wireless docking host 120. An example of this is shown in FIG. 13.

FIG. 13 is a communication diagram illustrating a communication flow for an example procedure 1300 between a wireless dockee 110 and a wireless docking host 120 to establish and operate a dockee-centric wireless docking session with each other, with the dockee initiating a transaction to store a persistent wireless docking environment (WDN) at the wireless docking host 120, in accordance with some examples of this disclosure. The procedure 1300 for establishing and operating a wireless docking session may also correspond in many aspects to the wireless docking session procedure 300 as shown in FIG. 3, including the component procedures 202, 242, 310, 320, 330, 340, 350, and 360, as shown in FIGS. 3 and 12 as well as 13.

Wireless docking session procedure 1300 in FIG. 13 differs from wireless docking procedures 300 of FIG. 3 or 1200 of FIG. 12 in that, after payload connection setup 360, the wireless dockee 110 initiates a transaction to create a persistent WDN at the wireless docking host 120. Wireless dockee 110 does this by sending a create persistent WDN request 1302 to wireless docking host 120. Wireless docking host 120 may in turn send a create persistent WDN response 1304 to the wireless dockee 110. The create persistent WDN response 1304 sent by the wireless docking host 120 may include a unique WDN_ID and an expiration time, in some examples.

In examples of wireless docking session procedure 1300 that use SOAP and GENA payloads, the create persistent WDN request 1302 sent by the wireless dockee 110 may include a SOAP body that may include or consist of the following XML element in some examples:

```
<xs:element name="dockeeCentricWDNCreateRequest">
    <xs:complexType>
        <xs:sequence>
            <xs:element name="dockeeID" type="xs:unsignedLong"/>
            <xs:element name="sessionID" type="xs:unsignedLong"/>
        </xs:sequence>
    </xs:complexType>
</xs:element>
```

The create persistent WDN response 1304 sent by the wireless docking host 120 may include a SOAP body that may include or consist of the following XML element in some examples:

```
<xs:element name="dockeeCentricWDNCreateResponse">
    <xs:complexType>
        <xs:sequence>
            <xs:element name="dockeeID"
                type="xs:unsignedLong"/>
            <xs:element name="sessionID"
                type="xs:unsignedLong"/>
            <xs:element name="accepted" type="xs:boolean"/>
            <xs:element name="WDNID" type="xs:unsignedLong"
```

-continued

```
minOccurs="0">
            <xs:annotation>
                <xs:documentation>a unique dockee
centric WDN ID</xs:documentation>
            </xs:annotation>
        </xs:element>
    </xs:sequence>
</xs:complexType>
</xs:element>
```

Figure 14:
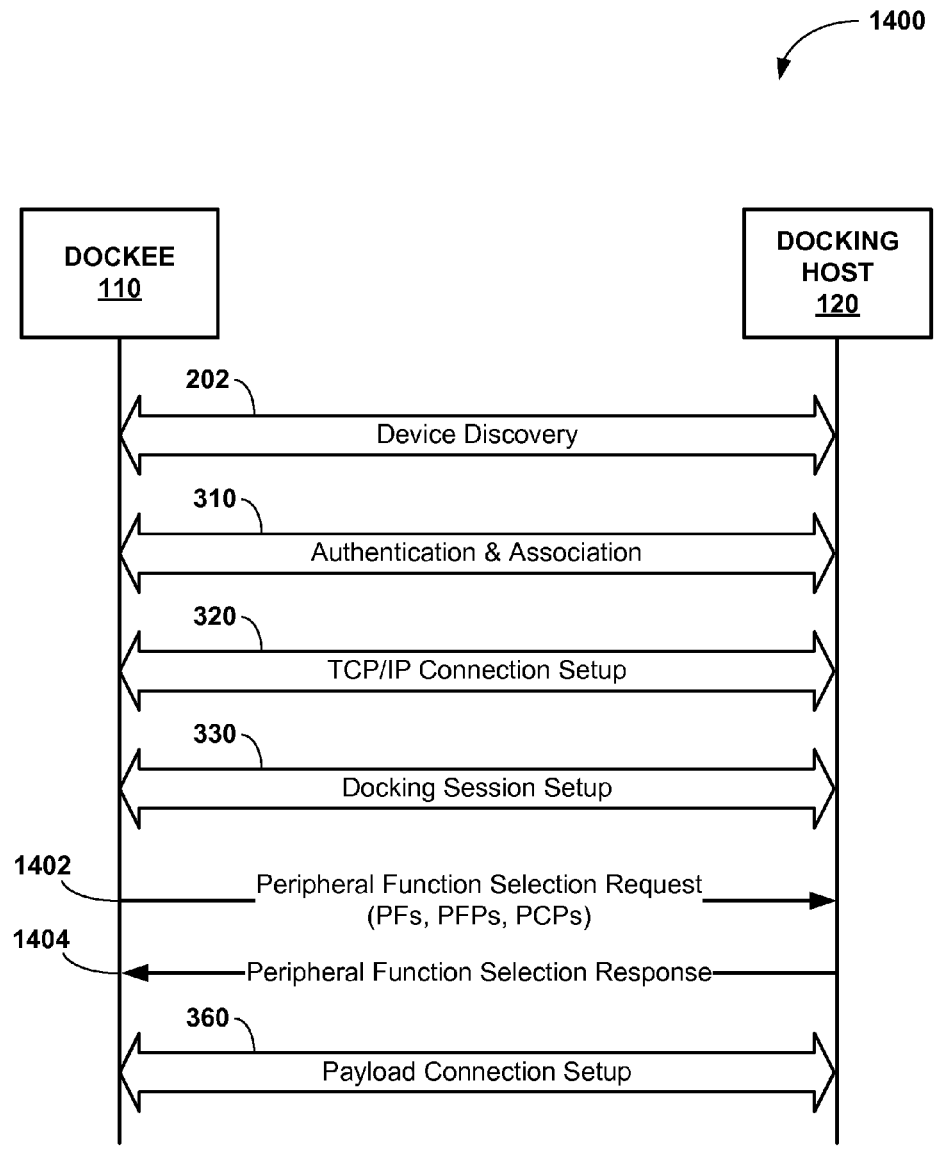
FIG. 14 is a communication diagram illustrating a communication flow for an example procedure between a dockee and a docking host to establish and operate a dockee-centric wireless docking session with each other, with a reduced peripheral function selection procedure enabled by a persistent wireless docking environment, in accordance with some examples of this disclosure.
Figure 15:
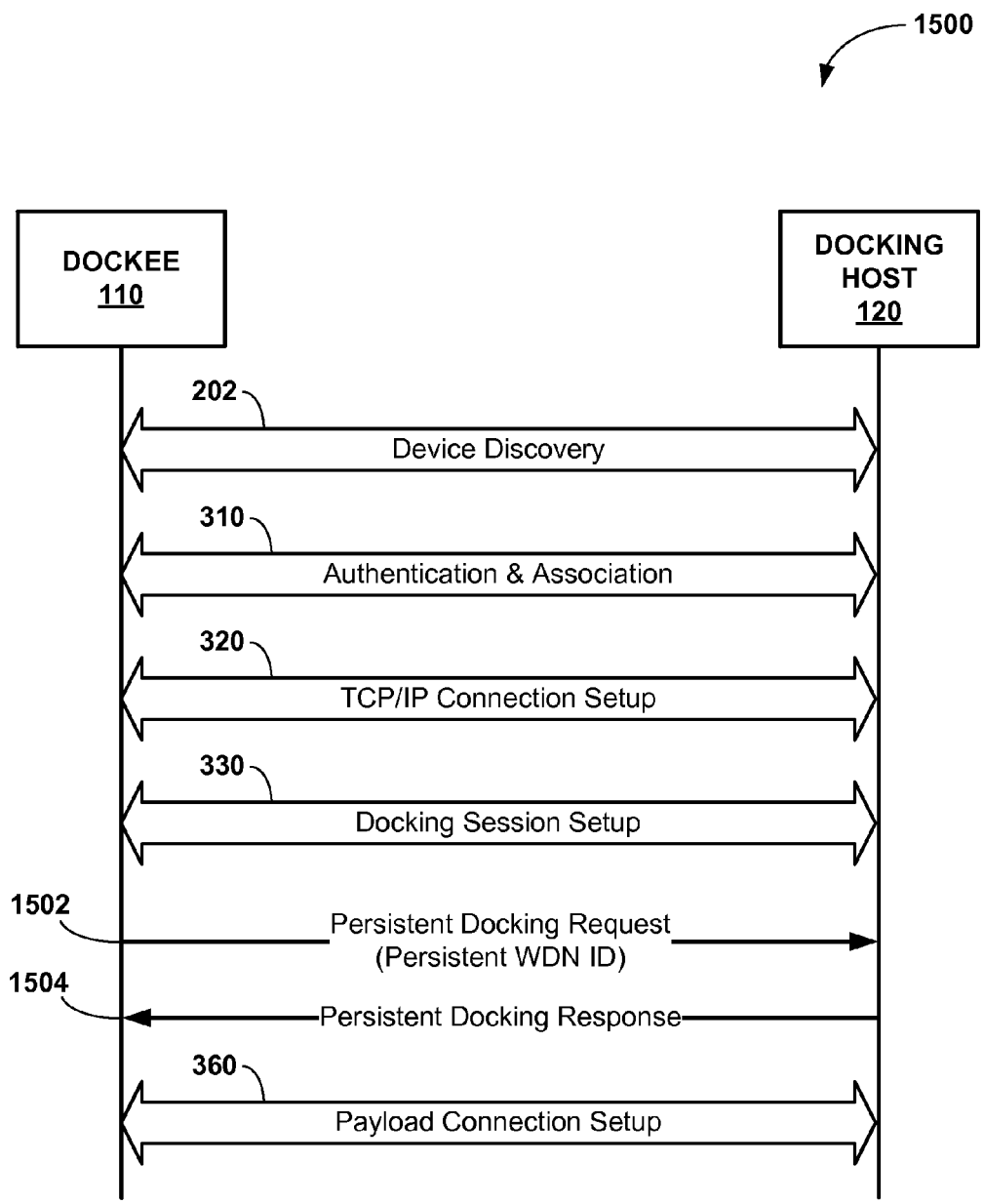
FIG. 15 is a communication diagram illustrating a communication flow for an example procedure between a dockee and a docking host to establish and operate a dockee-centric wireless docking session with each other, with a reduced persistent docking procedure enabled by a persistent wireless docking environment, in accordance with some examples of this disclosure.

After a persistent WDN is created, either at the wireless dockee 110 or at the wireless docking host 120, the wireless dockee 110 may use simplified and faster procedures to establish and operate subsequent wireless docking sessions with the same wireless docking host 120, in some examples. Illustrative examples of such simplified and faster procedures to establish and operate subsequent wireless docking sessions are shown in FIGS. 14 and 15.

In examples of wireless docking session procedure 1300 that use SOAP and GENA payloads, the create persistent WDN request 1302 sent by the wireless dockee 110 may include an empty message body. The wireless docking center 120 may respond with a create persistent WDN response 1304 that may include fields in the message body as shown below in Table 17.

TABLE 17

| Create Persistent WDN Response | | |
| --- | --- | --- |
| Field | Length (Octets) | Type |
| accepted | 1 | boolean |
| WDN_ID | 1 | uimsbf |

In the binary protocol fields of create persistent WDN response 1304 in this example, the "accepted" field indicates whether the request is accepted, and the "WDN_ID" field indicates a unique wireless data network (WDN)_ID assigned to the particular dockee 110 by wireless docking center 120.

FIG. 14 is a communication diagram illustrating a communication flow for an example procedure 1400 between a dockee 110 and a docking host 120 to establish and operate a dockee-centric wireless docking session with each other, with certain simplified procedures enabled by a persistent wireless docking environment stored at the dockee 110, in accordance with some examples of this disclosure. Wireless docking procedure 1400 of the example of FIG. 14 includes some aspects in common with wireless docking procedure 300 of the example of FIG. 3, including device discovery procedure 202, authentication and association procedure 310, TCP/IP connection setup 320, docking session setup 330, and payload connection setup 360.

Wireless docking procedure 1400 of FIG. 14 differs from wireless docking procedure 300 of FIG. 3 in other respects. Wireless docking procedure 1400 of FIG. 14 does not include pre-association service discovery procedure 242 or peripheral function inquiry procedure 340. This is because the persistent WDN at wireless dockee 110 stores the service information and the peripheral function information associated with the wireless docking host 120, that wireless dockee 110 would otherwise need to seek by way of both the pre-association service discovery procedure 242 and the peripheral function inquiry procedure 340. Therefore, the persistent WDN may simplify and quicken the procedure 1400 for wireless dockee 110 to establish and operate a wireless docking session with wireless docking host 120. FIG. 14 also shows peripheral function selection request 1402 and peripheral function selection response 1404, which may be similar to analogous peripheral function selection procedures in other examples except that they may be performed without having to perform a prior peripheral function inquiry procedure in the example procedure 1400 of FIG. 14.

The example procedure 1400 of FIG. 14 may be considered to be based on implicit persistent docking by dockee 110 since dockee 110 stores the persistent WDN locally at itself. This may be contrasted with persistent WDN storage at the wireless docking host 120, which may be considered explicit persistent docking, and an example of which is shown in FIG. 15.

FIG. 15 is a communication diagram illustrating a communication flow for an example procedure 1500 between a dockee 110 and a docking host 120 to establish and operate a dockee-centric wireless docking session with each other, with certain simplified procedures enabled by a persistent wireless docking environment stored at the docking host 120, in accordance with some examples of this disclosure. Wireless docking procedure 1500 of the example of FIG. 15 includes some aspects in common with wireless docking procedures 300 and 1400 of the examples of FIGS. 3 and 14, including device discovery procedure 202, authentication and association procedure 310, TCP/IP connection setup 320, docking session setup 330, and payload connection setup 360. Like persistent WDN-enabled docking procedure 1400 of the example of FIG. 14, docking procedure 1500 of FIG. 15 also avoids the need for dockee 110 and docking host 120 to perform pre-association service discovery procedure 242 or peripheral function inquiry procedure 340, since the information otherwise exchanged from these procedures is already stored in the persistent WDN.

Docking procedure 1500 of FIG. 15 also differs from docking procedure 1400 of FIG. 14 in that procedure 1500 may also omit a peripheral function selection procedure, such as peripheral function selection request 1402 and response 1404 of FIG. 14. Instead, in the example of FIG. 15, wireless docking host 120 may also store the peripheral function selection configuration data applicable to dockee 110 as part of the persistent WDN. Such peripheral function selection configuration data may be associated with a unique persistent wireless data environment identifier (WDN_ID) that may be associated with the persistent WDN stored at the docking host 120. Dockee 110 may also store this persistent WDN_ID, and use it to identify an applicable or desired persistent WDN to the docking host 120. As shown in FIG. 15, dockee 110 may send a persistent docking request 1502 that may include this persistent WDN_ID. Wireless docking host 120 may reply with a persistent docking response 1504. Persistent docking request 1502 and response 1504 may therefore in some examples be considered to function as a simpler substitute for the peripheral function selection procedures of other examples.

For the persistent WDN's to be stored "at" the dockee 110 or docking host 120, it will be understood that in other examples, the persistent WDN's or the persistent WDN configuration data may equivalently be stored somewhere accessible to the dockee 110 or docking host 120 respectively, which may include proximate or remote storage resources in various examples.

In examples using communication by SOAP and GENA payloads, the create persistent docking request 1502 sent by the wireless dockee 110 may include a SOAP body that may include or consist of the following XML element in some examples:

```
<xs:element name="persistentDockingRequest">
    <xs:complexType>
        <xs:sequence>
            <xs:element name="dockeeID"
                type="xs:unsignedLong"/>
            <xs:element name="sessionID"
                type="xs:unsignedLong"/>
            <xs:element name="dockeeCentricWDNID"
                type="xs:unsignedLong"/>
        </xs:sequence>
    </xs:complexType>
</xs:element>
```

The create persistent docking response 1504 sent by the wireless docking host 120 may include a SOAP body that may include or consist of the following XML element in some examples:

```
<xs:element name="persistentDockingResponse">
    <xs:complexType>
        <xs:sequence>
            <xs:element name="dockeeID"
                type="xs:unsignedLong"/>
            <xs:element name="sessionID"
                type="xs:unsignedLong"/>
            <xs:element name="accepted" type="xs:boolean"/>
            <xs:element name="peripheralFunction"
                minOccurs="0" maxOccurs="unbounded">
                <xs:complexType>
                    <xs:sequence>
                        <xs:element name="peripheralFunctionID"
                            type="xs:unsignedLong"/>
                        <xs:element name=
                            "peripheralFunctionProtocol" type="peripheralFunctionProtocol"/>
                        <xs:element name=
                            "payloadConnectionType" type="payloadConnectionType"/>
                    </xs:sequence>
                </xs:complexType>
            </xs:element>
        </xs:sequence>
    </xs:complexType>
</xs:element>
```

Figure 16:
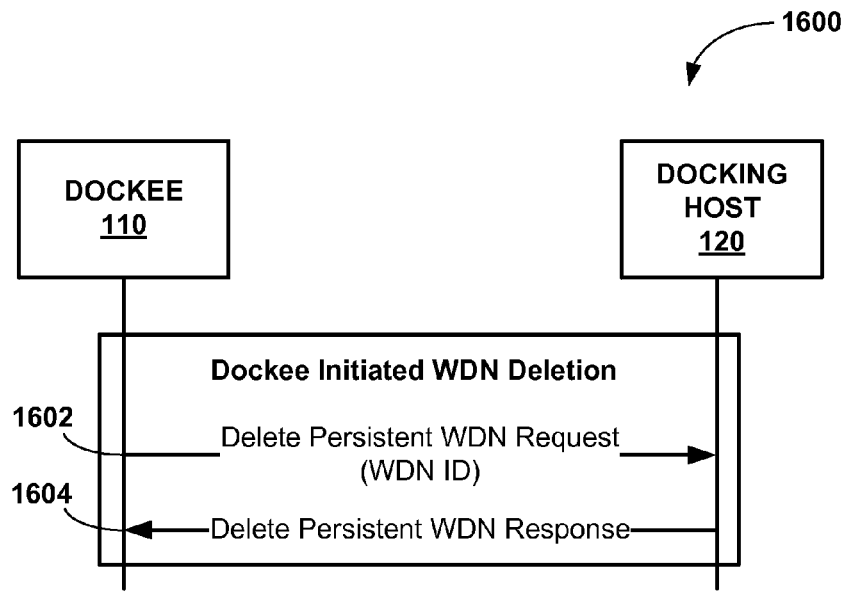
FIG. 16 is a communication diagram illustrating a communication flow for an example procedure between a dockee and a docking host for a dockee-initiated deletion of a persistent wireless docking environment, in accordance with some examples of this disclosure.
Figure 17:
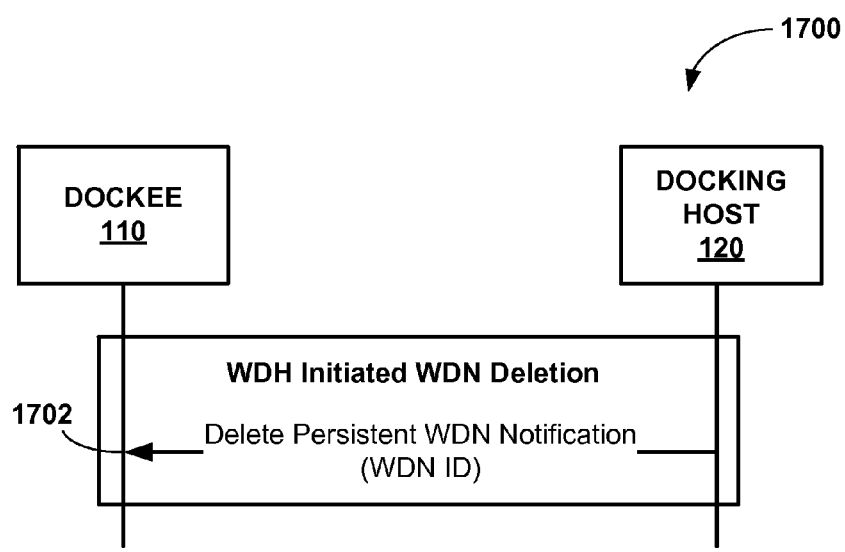
FIG. 17 is a communication diagram illustrating a communication flow for an example procedure between a dockee and a docking host for a docking host-initiated deletion of a persistent wireless docking environment, in accordance with some examples of this disclosure.

If a wireless dockee 110 stores a persistent WDN at a wireless docking host 120, as in procedure 1300 of FIG. 13, wireless dockee 110 may subsequently delete its persistent WDN at the wireless docking host 120 using a Dockee Initiated WDN Deletion Transaction, an example of which is shown in FIG. 16. The wireless docking host 120 can also delete a persistent WDN, and may notify a wireless dockee 110 of the deletion of its persistent WDN by sending a notification to the wireless dockee 110, an example of which is shown in FIG. 17.

In examples using communication via binary protocol over TCP/IP, the persistent docking request 1502 may include a message body with fields as shown below in Table 18.

TABLE 18

Persistent Docking Request

| Field | Length (Octets) | Type |
|---|---|---|
| WDN_ID | 1 | uimsbf |
| accepted | 1 | boolean |
| n_PFs | 1 | uimsbf |
| for (i = 0; i < n_PFs; i++) { | | |
|     PF_ID | 2 | uimsbf |
|     PFP_ID | 1 | uimsbf |
|     PCT_ID | 1 | uimsbf |
| } | | |

In the fields of persistent docking request 1502 in accordance with Table 16, the WDN_ID and other fields are as described above.

FIG. 16 is a communication diagram illustrating a communication flow for an example dockee-centric procedure 1600 for a dockee 110 to delete a persistent wireless data environment (WDN) at a docking host 120, in accordance with one or more examples of this disclosure. A wireless dockee 110 may send a delete persistent WDN request 1602 to the wireless docking host 120, and may include a persistent WDN_ID for the wireless docking host 120 to identify the persistent WDN to be deleted. The wireless docking host 120 may reply with a delete persistent WDN response 1604.

In examples using communication via SOAP and GENA payloads, the delete persistent WDN request 1602 sent by the wireless dockee 110 may include a SOAP body that may include or consist of the following XML element:

```
<xs:element name="dockeeCentricWDNDeleteRequest">
    <xs:complexType>
        <xs:sequence>
            <xs:element name="dockeeID" type="xs:unsignedLong"/>
            <xs:element name="sessionID" type="xs:unsignedLong"/>
            <xs:element name="WDNID" type="xs:unsignedLong"/>
        </xs:sequence>
    </xs:complexType>
</xs:element>
```

The delete persistent WDN response 1604 sent by the wireless docking host 120 may include a SOAP body that may include or consist of the following XML element in some examples:

```
<xs:element name="dockeeCentricWDNDeleteResponse">
    <xs:complexType>
        <xs:sequence>
            <xs:element name="dockeeID" type="xs:unsignedLong"/>
            <xs:element name="sessionID" type="xs:unsignedLong"/>
            <xs:element name="accepted" type="xs:boolean"/>
            <xs:element name="WDNID" type="xs:unsignedLong"/>
        </xs:sequence>
    </xs:complexType>
</xs:element>
```

In examples using communication via binary protocol messages, dockee 110 may send a delete persistent WDN request 1602 with a message body that includes a WDN_ID field as indicated below in Table 19.

TABLE 19

| Delete Persistent WDN Request | | |
|---|---|---|
| Field | Length (Octets) | Type |
| WDN_ID | 1 | uimsbf |

The wireless docking center 120 may respond with a delete persistent WDN response 1604 with a message body as indicated below in Table 20.

TABLE 20

| Delete Persistent WDN Response | | |
|---|---|---|
| Field | Length (Octets) | Type |
| WDN_ID | 1 | uimsbf |
| accepted | 1 | boolean |

FIG. 17 is a communication diagram illustrating a communication flow for an example procedure 1700 for a docking host 120 to delete a persistent wireless data environment (WDN) stored at the docking host 120 and to notify a dockee 110 of the deletion, in accordance with one or more examples of this disclosure. A wireless docking host 120 may unilaterally delete a persistent WDN stored at or accessible to the wireless docking host 120, in this example. The wireless docking host 120 may send a delete persistent WDN notification 1702 to the wireless dockee 110, and may include a persistent WDN_ID for the wireless dockee 110 to confirm the identity of the deleted persistent WDN.

In examples using SOAP and GENA payloads, the DockingHostNotification element in the Delete Persistent WDN Notification GENA event may include or consist of the following XML element:

The delete persistent WDN notification 1702 may include or consist of a GENA event that includes DockingHostNotification element, and may include or consist of the following XML element in some examples:

```
<xs:element name="dockeeCentricWDNDeleteNotif" minOccurs="0" >
    <xs:complexType>
        <xs:attribute name="dockeeID" type="xs:unsignedLong"/>
        <xs:attribute name="WDNID" type="xs:unsignedLong"/>
    </xs:complexType>
</xs:element>
```

In examples using a binary protocol message format, wireless docking center 120 may send a delete persistent WDN notification 1702 with a binary message with a message body as shown below in Table 21.

TABLE 21

| Delete Persistent WDN Notification | | |
|---|---|---|
| Field | Length (Octets) | Type |
| WDN_ID | 1 | uimsbf |

Figure 18:
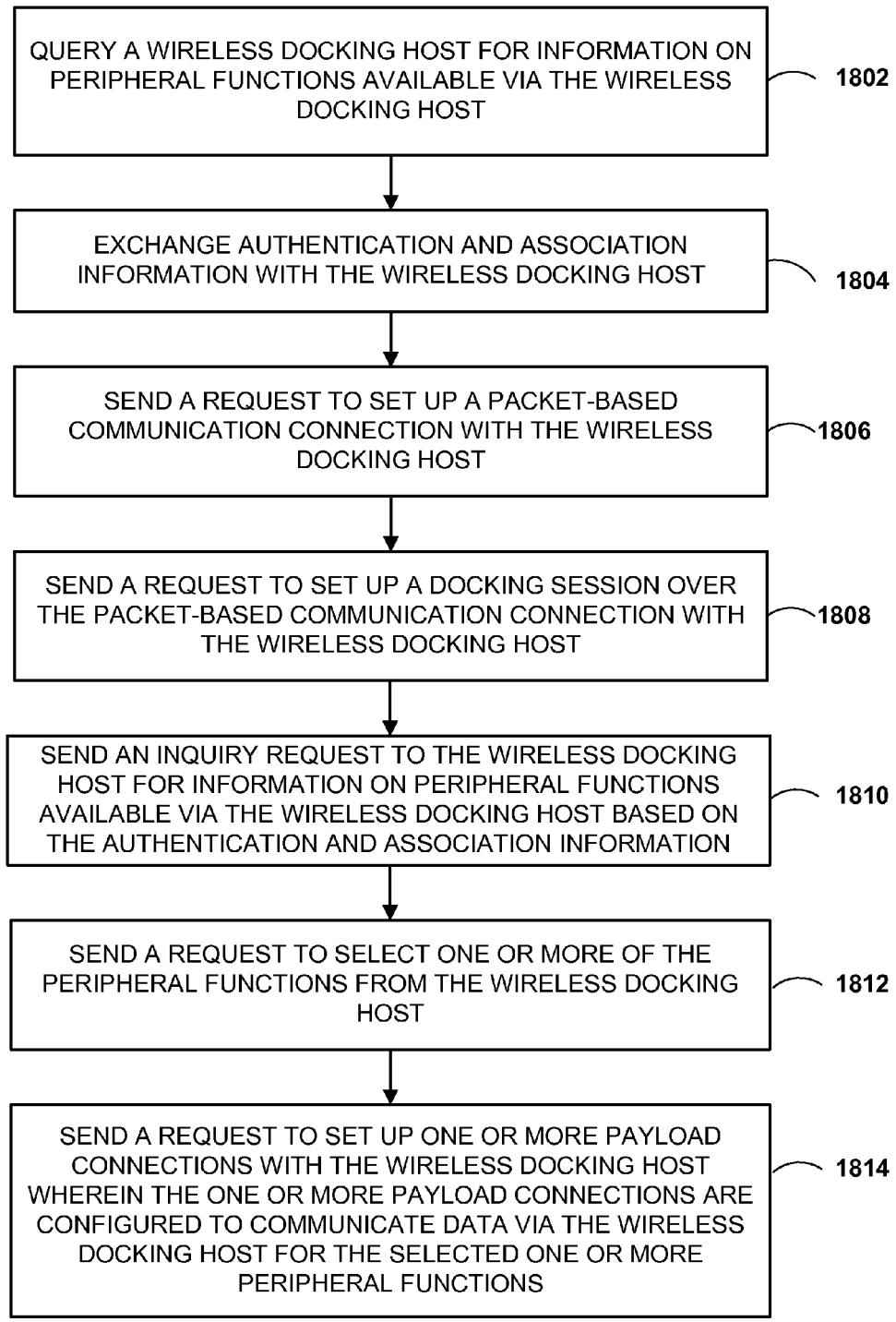
FIG. 18 is a flowchart illustrating an example method in accordance with one or more examples of this disclosure.

FIG. 18 is a flowchart illustrating an example method in accordance with one or more examples of this disclosure. The method of FIG. 18 may correspond to some examples of actions performed by wireless dockee 110 in docking session procedure 300 of FIG. 3 among other procedures disclosed herein, and may be performed by a wireless dockee 110, in some examples. The wireless dockee 110 may query a wireless docking host for information on peripheral functions available via the wireless docking host (1802). The wireless dockee 110 may exchange authentication and association information with the wireless docking host (1804). The wireless dockee 110 may send a request to set up a packet-based communication connection with the wireless docking host (1806). The wireless dockee 110 may send a request to set up a docking session over the packet-based communication connection with the wireless docking host (1808). The wireless dockee 110 may send an inquiry request to the wireless docking host for information on peripheral functions available via the wireless docking host based on the authentication and association information (1810). The wireless dockee 110 may send a request to select one or more of the peripheral functions from the wireless docking host (1812). The wireless dockee 110 may send a request to set up one or more payload connections with the wireless docking host wherein the one or more payload connections are configured to communicate data via the wireless docking host for the selected one or more peripheral functions (1814).

Figure 19:
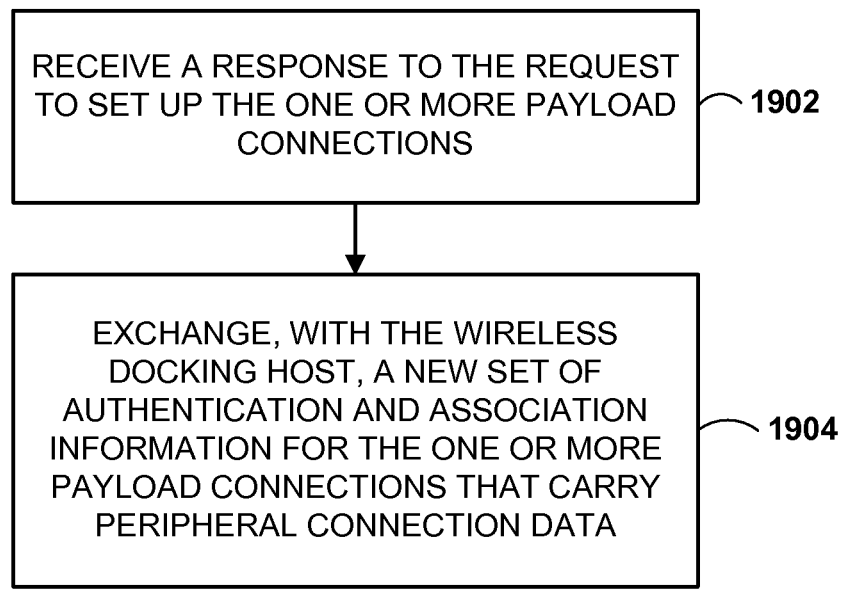
FIG. 19 is a flowchart illustrating another example method in accordance with one or more examples of this disclosure.

FIG. 19 is a flowchart illustrating another example method in accordance with one or more examples of this disclosure. The method of FIG. 19 may correspond to some examples of payload connection setup procedure 360 of FIGS. 3 and 8 among other payload connection setup procedures disclosed herein, and may be performed by a wireless dockee 110, in some examples. The wireless dockee 110 may receive a response to the request to set up the one or more payload connections (1902). The wireless dockee 110 may exchange, with the wireless docking host, a new set of authentication and association information for the one or more payload connections that carry peripheral connection data (1904). This payload connection authentication and association information may therefore be a new set of authentication and association information, separate from and independent of the authentication and association information associated with the docking session. The wireless dockee 110 may exchange the payload connection authentication and association information for the one or more payload connections with the wireless docking host using any of a number of different authentication and/or association formats, protocols, or other communications, at any of various communication layers. In some examples, wireless dockee 110 may exchange the payload connection authentication and association information with the wireless docking host in layer 2 communications (i.e., communications in the data link layer in the OSI model). In some examples, wireless dockee 110 may exchange the payload connection authentication and association information with the wireless docking host in IP (Internet Protocol) transport layer communications (e.g., communications in TCP/IP, UDP/IP, etc.). In some examples, wireless dockee 110 may exchange the payload connection authentication and association information with the wireless docking host in application layer communications (e.g., HTTP, SIP, etc.)

Figure 20:
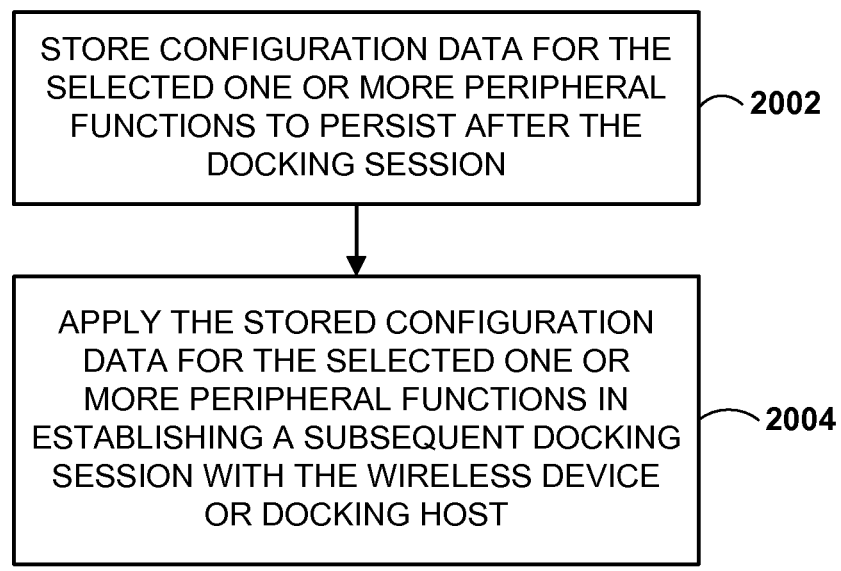
FIG. 20 is a flowchart illustrating another example method in accordance with one or more examples of this disclosure.

FIG. 20 is a flowchart illustrating another example method in accordance with one or more examples of this disclosure. The method of FIG. 20 may correspond to some examples of persistent wireless docking environment (WDN) creation procedures 1202, 1302, and 1304 of FIGS. 12 and 13 and subsequent use of the persistent WDN's, and may be performed by either a wireless dockee 110 or a wireless docking host 120, in some examples. The wireless dockee 110 or wireless docking host 120 may store configuration data for the selected one or more peripheral functions to persist after the docking session (2002), e.g., as a persistent wireless docking environment (WDN). The wireless dockee 110 or wireless docking host 120 may apply the stored configuration data for the selected one or more peripheral functions in establishing a subsequent docking session with the wireless dockee 110 or wireless docking host 120 (2004).

Figure 21:
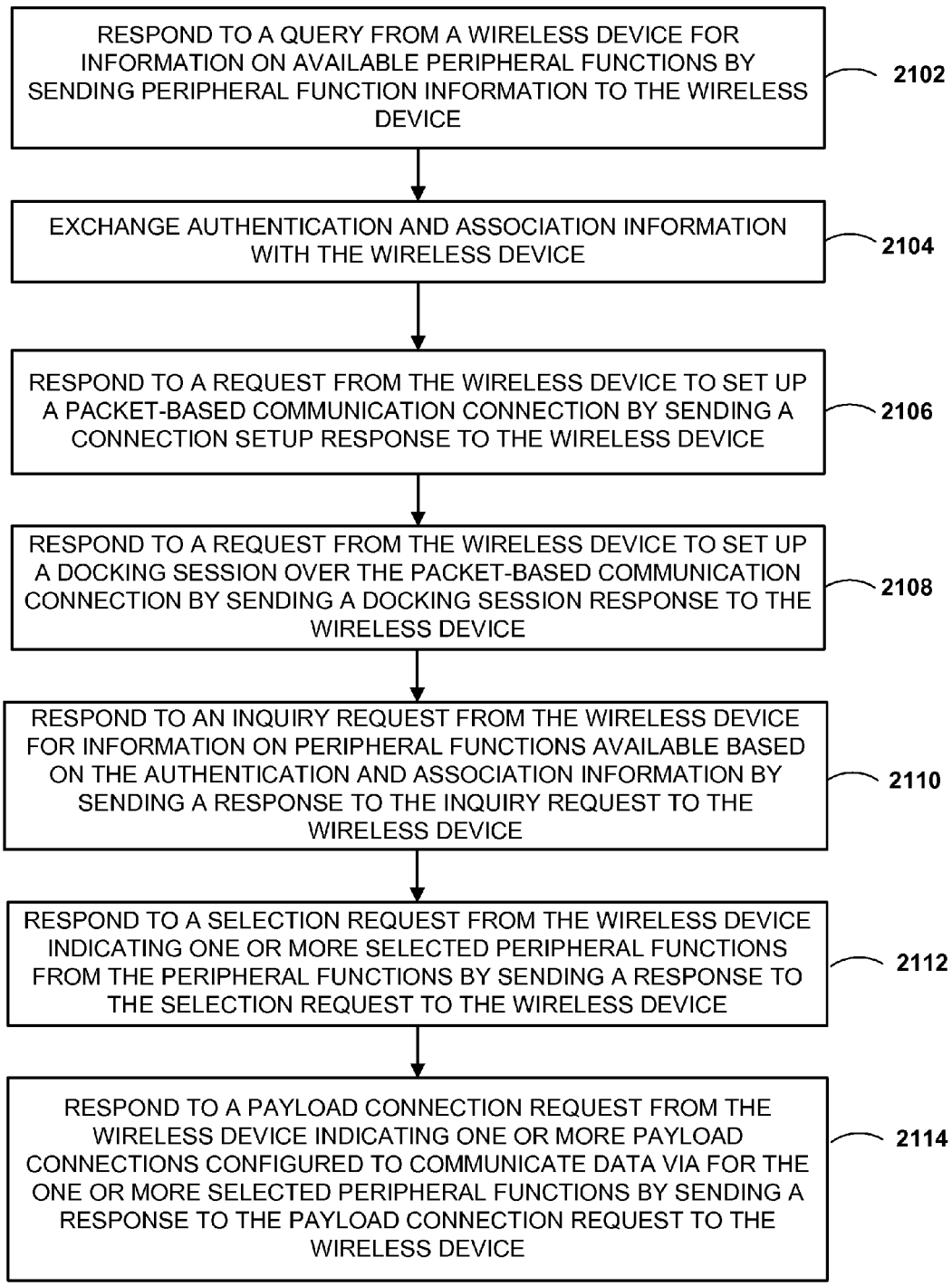
FIG. 21 is a flowchart illustrating another example method in accordance with one or more examples of this disclosure.

FIG. 21 is a flowchart illustrating another example method in accordance with one or more examples of this disclosure. The method of FIG. 21 may correspond to some examples of actions performed by wireless docking host 120 in docking session procedure 300 of FIG. 3 among other procedures disclosed herein, and may be performed by a wireless docking host 120, in some examples. The wireless docking host 120 may respond to a query from a wireless device for information on available peripheral functions by sending peripheral function information to the wireless device (2102). The wireless docking host 120 may exchange authentication and association information with the wireless device (2104). The wireless docking host 120 may respond to a request from the wireless device to set up a packet-based communication connection by sending a connection setup response to the wireless device (2106). The wireless docking host 120 may respond to a request from the wireless device to set up a docking session over the packet-based communication connection by sending a docking session response to the wireless device (2108). The wireless docking host 120 may respond to an inquiry request from the wireless device for information on peripheral functions available based on the authentication and association information by sending a response to the inquiry request to the wireless device (2110). The wireless docking host 120 may respond to a selection request from the wireless device indicating one or more selected peripheral functions from the peripheral functions by sending a response to the selection request to the wireless device (2112). The wireless docking host 120 may respond to a payload connection request from the wireless device indicating one or more payload connections configured to communicate data via for the one or more selected peripheral functions by sending a response to the payload connection request to the wireless device (2114).

Figure 22:
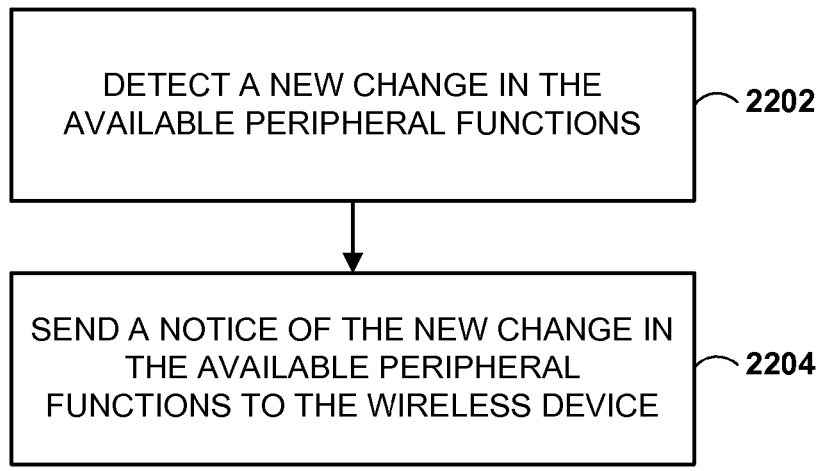
FIG. 22 is a flowchart illustrating another example method in accordance with one or more examples of this disclosure.

FIG. 22 is a flowchart illustrating another example method in accordance with one or more examples of this disclosure. The method of FIG. 22 may correspond to some examples of peripheral function change notification procedure 1100 of FIG. 11, and may be performed by a wireless docking host 120, in some examples. The wireless docking host 120 may detect a new change in the available peripheral functions (2202). The wireless docking host 120 may send a notice of the new change in the available peripheral functions to the wireless device (2204).

Figure 23:
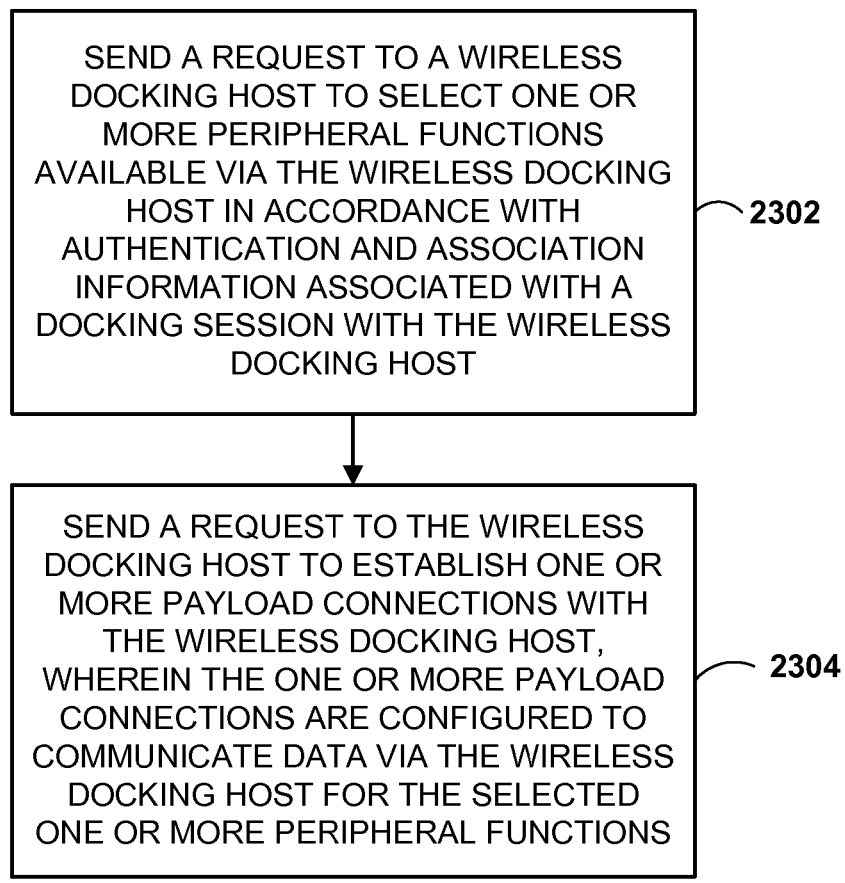
FIG. 23 is a flowchart illustrating another example method in accordance with one or more examples of this disclosure.

FIG. 23 is a flowchart illustrating another example method in accordance with one or more examples of this disclosure. Portions of method of FIG. 23 may correspond to some examples of portions of procedure 300 of FIG. 3 and/or procedure 360 of FIG. 8, and may be performed by a wireless dockee device 110, in some examples. A wireless dockee device 110 may send a request to a wireless docking host 120 to select one or more peripheral functions available via the wireless docking host 120 in accordance with authentication and association information associated with a docking session with the wireless docking host 120 (2302). The wireless dockee device 110 may send a request to the wireless docking host to establish one or more payload connections with the wireless docking host 120, wherein the one or more payload connections are configured to communicate data via the wireless docking host 120 for the selected one or more peripheral functions (2304).

Figure 24:
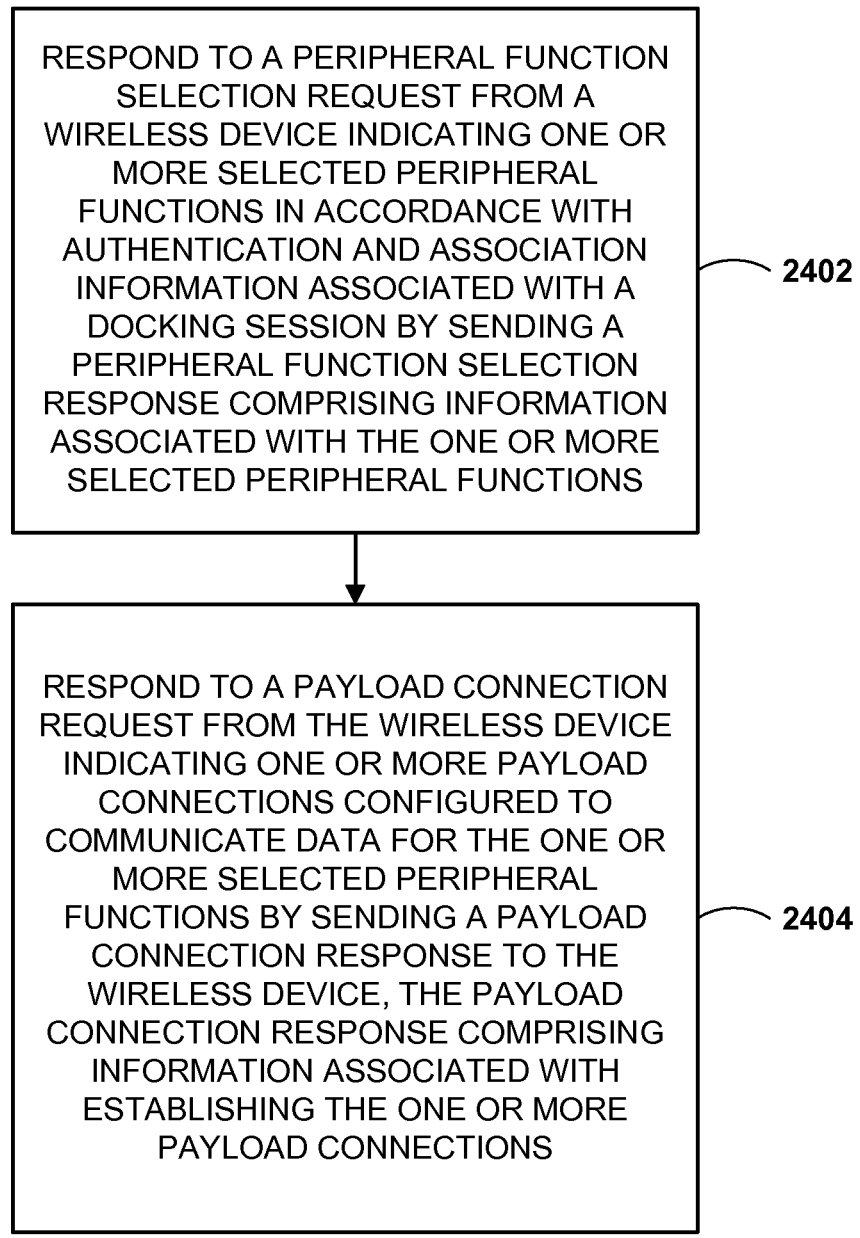
FIG. 24 is a flowchart illustrating another example method in accordance with one or more examples of this disclosure.

FIG. 24 is a flowchart illustrating another example method in accordance with one or more examples of this disclosure. Portions of method of FIG. 23 may correspond to some examples of portions of procedure 300 of FIG. 3 and/or procedure 360 of FIG. 8, and may be performed by a wireless docking host 120, in some examples. A wireless docking host 120 may respond to a peripheral function selection request from a wireless dockee device 110 indicating one or more selected peripheral functions in accordance with authentication and association information associated with a docking session by sending a peripheral function selection response comprising information associated with the one or more selected peripheral functions (2402). The wireless docking host 120 may respond to a payload connection request from the wireless dockee device 110 indicating one or more payload connections configured to communicate data for the one or more selected peripheral functions by sending a payload connection response to the wireless device, the payload connection response comprising information associated with establishing the one or more payload connections (2404).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
sending a request to a wireless docking host to select one or more peripheral functions available via the wireless docking host in accordance with authentication and association information associated with a docking session with the wireless docking host;
sending a request to the wireless docking host to establish one or more payload connections with the wireless docking host, wherein the one or more payload connections are configured to communicate data via the wireless docking host for the selected one or more peripheral functions; and
receiving, from the wireless docking host, a notice of a new change in the peripheral functions available via the wireless docking host.

2. The method of claim 1, wherein at least one of sending the request to select the one or more peripheral functions and sending the request to establish the one or more payload connections comprises sending a request via a SOAP payload.

3. The method of claim 1, wherein at least one of sending the request to select the one or more peripheral functions and sending the request to establish the one or more payload connections comprises sending a request via a binary protocol format message.

4. The method of claim 1, further comprising:
creating a persistent wireless docking environment; and
storing information associated with the one or more peripheral functions in association with the persistent wireless docking environment to persist after the docking session.

5. The method of claim 4, wherein creating the persistent wireless docking environment comprises storing the persistent wireless docking environment at a wireless dockee device.

6. The method of claim 4, wherein creating the persistent wireless docking environment comprises sending a request to the wireless docking host to create the persistent wireless docking environment.

7. The method of claim 4, wherein storing the information associated with the one or more peripheral functions in association with the persistent wireless docking environment comprises storing configuration data for the selected one or more peripheral functions.

8. The method of claim 4, further comprising:
sending a request to the wireless docking host to establish a subsequent docking session with the wireless docking host; and
sending a new request to the wireless docking host to select one or more peripheral functions available via the wireless docking host based on the information associated with the one or more peripheral functions as stored in association with the persistent wireless docking environment.

9. The method of claim 4, further comprising:
sending a request to the wireless docking host to establish a subsequent docking session with the wireless docking host; and
sending a request to the wireless docking host to access the persistent wireless docking environment.

10. The method of claim 1, wherein the authentication and association information are received via performing a first exchange of authentication and association information with the wireless docking host, the method further comprising:
querying the wireless docking host for information on peripheral functions available via the wireless docking host, prior to performing the first exchange of authentication and association information with the wireless docking host; and
performing, subsequent to the first wireless docking session, a second exchange of authentication and association information with the wireless docking host based on available peripheral function information stored in the persistent wireless docking environment, without querying the wireless docking host for information on peripheral functions available via the wireless docking host.

11. The method of claim 1, further comprising:
sending, prior to the sending of the request to select the one or more peripheral functions, a request to the wireless docking host for information on the peripheral functions available via the wireless docking host in accordance with the authentication and association information associated with the docking session with the wireless docking host,
wherein the request to select the one or more peripheral functions is based on the response to the request for information on the peripheral functions available via the wireless docking host.

12. The method of claim 1, further comprising:
receiving a response to the request to establish the one or more payload connections; and
exchanging, with the wireless docking host, a new set of authentication and association information for the one or more payload connections for communicating the data for the selected one or more peripheral functions.

13. The method of claim 12, wherein exchanging the new set of authentication and association information for the one or more payload connections further comprises:
exchanging the new set of authentication and association information in layer 2 communications.

14. The method of claim 12, wherein exchanging the new set of authentication and association information for the one or more payload connections further comprises:
exchanging the new set of authentication and association information in IP transport layer communications.

15. The method of claim 12, wherein exchanging the new set of authentication and association information for the one or more payload connections further comprises:
exchanging the new set of authentication and association information in application layer communications.

16. The method of claim 1, further comprising preparing to establish the docking session with the wireless docking host prior to sending the request to the wireless docking host to select the one or more peripheral functions available via the wireless docking host, wherein preparing to establish the docking session comprises:
querying the wireless docking host for information on peripheral functions available via the wireless docking host;
exchanging the authentication and association information with the wireless docking host;
sending a request to set up a packet-based communication connection with the wireless docking host; and
sending a request to set up the docking session over the packet-based communication connection with the wireless docking host.

17. The method of claim 16, wherein querying the wireless docking host and exchanging the authentication and association information with the wireless docking host are performed in layer 2 communications, and sending the request to set up the packet-based communication connection and sending the request to set up the docking session over the packet-based communication connection are performed in transport layer communications.

18. The method of claim 17, wherein the transport layer communications comprise communications in accordance with Transmission Control Protocol/Internet Protocol (TCP/IP) specifications.

19. The method of claim 1, wherein sending the request to the wireless docking host to select the one or more peripheral functions comprises specifying information on one or more of: the one or more peripheral functions, one or more protocols for the one or more peripheral functions, and one or more protocols for payload content associated with the one or more peripheral functions.

20. A method comprising:
responding to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions;
responding to a payload connection request from the wireless device indicating one or more payload connections configured to communicate data for the one or more selected peripheral functions by sending a payload connection response to the wireless device, the payload connection response comprising information associated with establishing the one or more payload connections;
detecting a new change in available peripheral functions; and
sending a notice of the new change in the available peripheral functions to the wireless device.

21. The method of claim 20, wherein sending at least one of the peripheral function selection response and the payload connection response comprises sending a response via at least one of a SOAP payload or a General Event Notification Architecture (GENA) notification event.

22. The method of claim 20, wherein sending at least one of the peripheral function selection response and the payload connection response comprises sending a response via a binary protocol format message.

23. The method of claim 20, further comprising:
receiving a request to create a persistent wireless docking environment;
creating a persistent wireless docking environment;
storing information associated with the one or more selected peripheral functions in association with the persistent wireless docking environment to persist after the docking session; and
sending a persistent docking response to the wireless device, the persistent docking response comprising information associated with the persistent wireless docking environment.

24. The method of claim 23, further comprising:
receiving a request from the wireless device to establish a subsequent docking session; and
applying the information associated with the one or more selected peripheral functions in association with the persistent wireless docking environment in establishing the subsequent docking session.

25. A device comprising one or more processors, wherein the one or more processors are configured to:
send a request to a wireless docking host to select one or more peripheral functions available via the wireless docking host in accordance with authentication and association information associated with a docking session with the wireless docking host;
send a request to the wireless docking host to establish one or more payload connections with the wireless docking host, wherein the one or more payload connections are configured to communicate data via the wireless docking host for the selected one or more peripheral functions; and
receive, from the wireless docking host, a notice of a new change in the peripheral functions available via the wireless docking host.

26. The device of claim 25, wherein the one or more processors are further configured such that at least one of sending the request to select the one or more peripheral functions and sending the request to establish the one or more payload connections comprises sending a request via a SOAP payload.

27. The device of claim 25, wherein the one or more processors are further configured such that at least one of sending the request to select the one or more peripheral functions and sending the request to establish the one or more payload connections comprises sending a request via a binary protocol format message.

28. The device of claim 25, wherein the one or more processors are further configured to:
create a persistent wireless docking environment; and
store information associated with the one or more peripheral functions in association with the persistent wireless docking environment to persist after the docking session.

29. The device of claim 28, wherein the one or more processors are further configured such that creating the persistent wireless docking environment comprises storing the persistent wireless docking environment at a wireless dockee device.

30. The device of claim 28, wherein the one or more processors are further configured such that creating the persistent wireless docking environment comprises sending a request to the wireless docking host to create the persistent wireless docking environment.

31. The device of claim 28, wherein the one or more processors are further configured such that storing the information associated with the one or more peripheral functions in association with the persistent wireless docking environment comprises storing configuration data for the selected one or more peripheral functions.

32. The device of claim 28, wherein the one or more processors are further configured to:
send a request to the wireless docking host to establish a subsequent docking session with the wireless docking host; and
send a new request to the wireless docking host to select one or more peripheral functions available via the wireless docking host based on the information associated with the one or more peripheral functions as stored in association with the persistent wireless docking environment.

33. The device of claim 28, wherein the one or more processors are further configured to:
send a request to the wireless docking host to establish a subsequent docking session with the wireless docking host; and
send a request to the wireless docking host to access the persistent wireless docking environment.

34. The device of claim 25, wherein the one or more processors are further configured such that the authentication and association information are received via performing a first exchange of authentication and association information with the wireless docking host, and the one or more processors are further configured to:
query the wireless docking host for information on peripheral functions available via the wireless docking host, prior to performing the first exchange of authentication and association information with the wireless docking host; and
perform, subsequent to the first wireless docking session, a second exchange of authentication and association information with the wireless docking host based on available peripheral function information stored in the persistent wireless docking environment, without querying the wireless docking host for information on peripheral functions available via the wireless docking host.

35. The device of claim 25, wherein the one or more processors are further configured to:
send, prior to the sending of the request to select the one or more peripheral functions, a request to the wireless docking host for information on the peripheral functions available via the wireless docking host in accordance with the authentication and association information associated with the docking session with the wireless docking host,
wherein the request to select the one or more peripheral functions is based on the response to the request for information on the peripheral functions available via the wireless docking host.

36. The device of claim 25, wherein the one or more processors are further configured to:
receive a response to the request to establish the one or more payload connections; and
exchange, with the wireless docking host, a new set of authentication and association information for the one or more payload connections for communicating the data for the selected one or more peripheral functions.

37. The device of claim 36, wherein the one or more processors are further configured such that exchanging the new set of authentication and association information for the one or more payload connections further comprises:
exchanging the new set of authentication and association information in layer 2 communications.

38. The device of claim 36, wherein the one or more processors are further configured such that exchanging the new set of authentication and association information for the one or more payload connections further comprises:
exchanging the new set of authentication and association information in IP transport layer communications.

39. The device of claim 36, wherein the one or more processors are further configured such that exchanging the new set of authentication and association information for the one or more payload connections further comprises:

exchanging the new set of authentication and association information in application layer communications.

40. The device of claim 25, wherein the one or more processors are further configured to prepare to establish the docking session with the wireless docking host prior to sending the request to the wireless docking host to select the one or more peripheral functions available via the wireless docking host, wherein being configured to prepare to establish the docking session comprises the one or more processors being further configured to:
   query the wireless docking host for information on peripheral functions available via the wireless docking host;
   exchange the authentication and association information with the wireless docking host;
   send a request to set up a packet-based communication connection with the wireless docking host; and
   send a request to set up the docking session over the packet-based communication connection with the wireless docking host.

41. The device of claim 40, wherein the one or more processors are further configured such that querying the wireless docking host and exchanging the authentication and association information with the wireless docking host are performed in layer 2 communications, and sending the request to set up the packet-based communication connection and sending the request to set up the docking session over the packet-based communication connection are performed in transport layer communications.

42. The device of claim 41, wherein the one or more processors are further configured such that the transport layer communications comprise communications in accordance with Transmission Control Protocol/Internet Protocol (TCP/IP) specifications.

43. The device of claim 25, wherein the one or more processors are further configured such that sending the request to the wireless docking host to select the one or more peripheral functions comprises specifying information on one or more of: the one or more peripheral functions, one or more protocols for the one or more peripheral functions, and one or more protocols for payload content associated with the one or more peripheral functions.

44. A device comprising one or more processors, wherein the one or more processors are configured to:
   respond to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions;
   respond to a payload connection request from the wireless device indicating one or more payload connections configured to communicate data for the one or more selected peripheral functions by sending a payload connection response to the wireless device, the payload connection response comprising information associated with establishing the one or more payload connections;
   detect a new change in available peripheral functions; and
   send a notice of the new change in the available peripheral functions to the wireless device.

45. The device of claim 44, wherein the one or more processors are further configured such that sending at least one of the peripheral function selection response and the payload connection response comprises sending a response via at least one of a SOAP payload or a General Event Notification Architecture (GENA) notification event.

46. The device of claim 44, wherein the one or more processors are further configured such that sending at least one of the peripheral function selection response and the payload connection response comprises sending a response via a binary protocol format message.

47. The device of claim 44, wherein the one or more processors are further configured to:
   receive a request to create a persistent wireless docking environment;
   create a persistent wireless docking environment;
   store information associated with the one or more selected peripheral functions in association with the persistent wireless docking environment to persist after the docking session; and
   send a persistent docking response to the wireless device, the persistent docking response comprising information associated with the persistent wireless docking environment.

48. The device of claim 47, wherein the one or more processors are further configured to:
   receive a request from the wireless device to establish a subsequent docking session; and
   apply the information associated with the one or more selected peripheral functions in association with the persistent wireless docking environment in establishing the subsequent docking session.

49. An apparatus comprising:
   means for sending a request to a wireless docking host to select one or more peripheral functions available via the wireless docking host in accordance with authentication and association information associated with a docking session with the wireless docking host; and
   means for sending a request to the wireless docking host to establish one or more payload connections with the wireless docking host, wherein the one or more payload connections are configured to communicate data via the wireless docking host for the selected one or more peripheral functions; and
   means for receiving, from the wireless docking host, a notice of a new change in the peripheral functions available via the wireless docking host.

50. The apparatus of claim 49, wherein at least one of the means for sending the request to select the one or more peripheral functions and the means for sending the request to establish the one or more payload connections comprises means for sending a request via a SOAP payload.

51. The apparatus of claim 49, wherein at least one of the means for sending the request to select the one or more peripheral functions and the means for sending the request to establish the one or more payload connections comprises means for sending a request via a binary protocol format message.

52. The apparatus of claim 49, further comprising:
   means for creating a persistent wireless docking environment; and
   means for storing information associated with the one or more peripheral functions in association with the persistent wireless docking environment to persist after the docking session.

53. The apparatus of claim 52, wherein the means for creating the persistent wireless docking environment comprises means for storing the persistent wireless docking environment at a wireless dockee device.

54. The apparatus of claim 52, wherein the means for creating the persistent wireless docking environment comprises means for sending a request to the wireless docking host to create the persistent wireless docking environment.

55. The apparatus of claim 52, wherein the means for storing the information associated with the one or more peripheral functions in association with the persistent wireless docking environment comprises means for storing configuration data for the selected one or more peripheral functions.

56. The apparatus of claim 52, further comprising:
means for sending a request to the wireless docking host to establish a subsequent docking session with the wireless docking host; and
means for sending a new request to the wireless docking host to select one or more peripheral functions available via the wireless docking host based on the information associated with the one or more peripheral functions as stored in association with the persistent wireless docking environment.

57. The apparatus of claim 52, further comprising:
means for sending a request to the wireless docking host to establish a subsequent docking session with the wireless docking host; and
means for sending a request to the wireless docking host to access the persistent wireless docking environment.

58. The apparatus of claim 49, wherein the authentication and association information are received via performing a first exchange of authentication and association information with the wireless docking host, the method further comprising:
means for querying the wireless docking host for information on peripheral functions available via the wireless docking host, prior to performing the first exchange of authentication and association information with the wireless docking host; and
means for performing, subsequent to the first wireless docking session, a second exchange of authentication and association information with the wireless docking host based on available peripheral function information stored in the persistent wireless docking environment, without querying the wireless docking host for information on peripheral functions available via the wireless docking host.

59. The apparatus of claim 49, further comprising:
means for sending, prior to the sending of the request to select the one or more peripheral functions, a request to the wireless docking host for information on the peripheral functions available via the wireless docking host in accordance with the authentication and association information associated with the docking session with the wireless docking host,
wherein the request to select the one or more peripheral functions is based on the response to the request for information on the peripheral functions available via the wireless docking host.

60. The apparatus of claim 49, further comprising:
means for receiving a response to the request to establish the one or more payload connections; and
means for exchanging, with the wireless docking host, a new set of authentication and association information for the one or more payload connections for communicating the data for the selected one or more peripheral functions.

61. The apparatus of claim 60, wherein the means for exchanging the new set of authentication and association information for the one or more payload connections further comprises:
means for exchanging the new set of authentication and association information in layer 2 communications.

62. The apparatus of claim 60, wherein the means for exchanging the new set of authentication and association information for the one or more payload connections further comprises:
means for exchanging the new set of authentication and association information in IP transport layer communications.

63. The apparatus of claim 60, wherein the means for exchanging the new set of authentication and association information for the one or more payload connections further comprises:
means for exchanging the new set of authentication and association information in application layer communications.

64. The apparatus of claim 49, further comprising means for preparing to establish the docking session with the wireless docking host prior to sending the request to the wireless docking host to select the one or more peripheral functions available via the wireless docking host, wherein the means for preparing to establish the docking session comprises:
means for querying the wireless docking host for information on peripheral functions available via the wireless docking host;
means for exchanging the authentication and association information with the wireless docking host;
means for sending a request to set up a packet-based communication connection with the wireless docking host; and
means for sending a request to set up the docking session over the packet-based communication connection with the wireless docking host.

65. The apparatus of claim 64, wherein the means for querying the wireless docking host and exchanging the authentication and association information with the wireless docking host are performed in layer 2 communications, and sending the request to set up the packet-based communication connection and sending the request to set up the docking session over the packet-based communication connection are performed in transport layer communications.

66. The apparatus of claim 65, wherein the transport layer communications comprise communications in accordance with Transmission Control Protocol/Internet Protocol (TCP/IP) specifications.

67. The apparatus of claim 49, wherein the means for sending the request to the wireless docking host to select the one or more peripheral functions comprises means for specifying information on one or more of: the one or more peripheral functions, one or more protocols for the one or more peripheral functions, and one or more protocols for payload content associated with the one or more peripheral functions.

68. An apparatus comprising:
means for responding to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions;
means for responding to a payload connection request from the wireless device indicating one or more payload connections configured to communicate data for the one or more selected peripheral functions by sending a payload connection response to the wireless device, the payload connection response comprising information associated with establishing the one or more payload connections;

means for detecting a new change in available peripheral functions; and means for sending a notice of the new change in the available peripheral functions to the wireless device.

69. The apparatus of claim 68, wherein the means for sending at least one of the peripheral function selection response and the payload connection response comprises means for sending a response via at least one of a SOAP payload or a General Event Notification Architecture (GENA) notification event.

70. The apparatus of claim 68, wherein the means for sending at least one of the peripheral function selection response and the payload connection response comprises means for sending a response via a binary protocol format message.

71. The apparatus of claim 68, further comprising:

means for receiving a request to create a persistent wireless docking environment;

means for creating a persistent wireless docking environment;

means for storing information associated with the one or more selected peripheral functions in association with the persistent wireless docking environment to persist after the docking session; and means for sending a persistent docking response to the wireless device, the persistent docking response comprising information associated with the persistent wireless docking environment.

72. The apparatus of claim 71, further comprising:

means for receiving a request from the wireless device to establish a subsequent docking session; and means for applying the information associated with the one or more selected peripheral functions in association with the persistent wireless docking environment in establishing the subsequent docking session.

73. A non-transitory computer-readable storage medium comprising instructions stored thereon that, when executed, configure one or more processors to:

send a request to a wireless docking host to select one or more peripheral functions available via the wireless docking host in accordance with authentication and association information associated with a docking session with the wireless docking host;

send a request to the wireless docking host to establish one or more payload connections with the wireless docking host, wherein the one or more payload connections are configured to communicate data via the wireless docking host for the selected one or more peripheral functions; and receive, from the wireless docking host, a notice of a new change in the peripheral functions available via the wireless docking host.

74. The non-transitory computer-readable storage medium of claim 73, wherein the instructions further configure the one or more processors such that at least one of sending the request to select the one or more peripheral functions and sending the request to establish the one or more payload connections comprises sending a request via a SOAP payload.

75. The non-transitory computer-readable storage medium of claim 73, wherein the instructions further configure the one or more processors such that at least one of sending the request to select the one or more peripheral functions and sending the request to establish the one or more payload connections comprises sending a request via a binary protocol format message.

76. The non-transitory computer-readable storage medium of claim 73, wherein the instructions further configure the one or more processors to:

create a persistent wireless docking environment; and store information associated with the one or more peripheral functions in association with the persistent wireless docking environment to persist after the docking session.

77. The non-transitory computer-readable storage medium of claim 76, wherein the instructions further configure the one or more processors such that creating the persistent wireless docking environment comprises storing the persistent wireless docking environment at a wireless dockee device.

78. The non-transitory computer-readable storage medium of claim 76, wherein the instructions further configure the one or more processors such that creating the persistent wireless docking environment comprises sending a request to the wireless docking host to create the persistent wireless docking environment.

79. The non-transitory computer-readable storage medium of claim 76, wherein the instructions further configure the one or more processors such that storing the information associated with the one or more peripheral functions in association with the persistent wireless docking environment comprises storing configuration data for the selected one or more peripheral functions.

80. The non-transitory computer-readable storage medium of claim 76, wherein the instructions further configure the one or more processors to:

send a request to the wireless docking host to establish a subsequent docking session with the wireless docking host; and send a new request to the wireless docking host to select one or more peripheral functions available via the wireless docking host based on the information associated with the one or more peripheral functions as stored in association with the persistent wireless docking environment.

81. The non-transitory computer-readable storage medium of claim 76, wherein the instructions further configure the one or more processors to:

send a request to the wireless docking host to establish a subsequent docking session with the wireless docking host; and send a request to the wireless docking host to access the persistent wireless docking environment.

82. The non-transitory computer-readable storage medium of claim 73, wherein the instructions further configure the one or more processors such that the authentication and association information are received via performing a first exchange of authentication and association information with the wireless docking host, and the instructions further configure the one or more processors to:

query the wireless docking host for information on peripheral functions available via the wireless docking host, prior to performing the first exchange of authentication and association information with the wireless docking host; and perform, subsequent to the first wireless docking session, a second exchange of authentication and association information with the wireless docking host based on available peripheral function information stored in the persistent wireless docking environment, without querying the wireless docking host for information on peripheral functions available via the wireless docking host.

83. The non-transitory computer-readable storage medium of claim 73, wherein the instructions further configure the one or more processors to:
    send, prior to the sending of the request to select the one or more peripheral functions, a request to the wireless docking host for information on the peripheral functions available via the wireless docking host in accordance with the authentication and association information associated with the docking session with the wireless docking host,
    wherein the request to select the one or more peripheral functions is based on the response to the request for information on the peripheral functions available via the wireless docking host.

84. The non-transitory computer-readable storage medium of claim 73, wherein the instructions further configure the one or more processors to:
    receive a response to the request to establish the one or more payload connections; and
    exchange, with the wireless docking host, a new set of authentication and association information for the one or more payload connections for communicating the data for the selected one or more peripheral functions.

85. The non-transitory computer-readable storage medium of claim 84, wherein the instructions further configure the one or more processors such that exchanging the new set of authentication and association information for the one or more payload connections further comprises:
    exchanging the new set of authentication and association information in layer 2 communications.

86. The non-transitory computer-readable storage medium of claim 84, wherein the instructions further configure the one or more processors such that exchanging the new set of authentication and association information for the one or more payload connections further comprises:
    exchanging the new set of authentication and association information in IP transport layer communications.

87. The non-transitory computer-readable storage medium of claim 84, wherein the instructions further configure the one or more processors such that exchanging the new set of authentication and association information for the one or more payload connections further comprises:
    exchanging the new set of authentication and association information in application layer communications.

88. The non-transitory computer-readable storage medium of claim 73, wherein the instructions further configure the one or more processors to prepare to establish the docking session with the wireless docking host prior to sending the request to the wireless docking host to select the one or more peripheral functions available via the wireless docking host, wherein configuring the one or more processors to prepare to establish the docking session further comprises the instructions configuring the one or more processors to:
    query the wireless docking host for information on peripheral functions available via the wireless docking host;
    exchange the authentication and association information with the wireless docking host;
    send a request to set up a packet-based communication connection with the wireless docking host; and
    send a request to set up the docking session over the packet-based communication connection with the wireless docking host.

89. The non-transitory computer-readable storage medium of claim 88, wherein the instructions further configure the one or more processors such that querying the wireless docking host and exchanging the authentication and association information with the wireless docking host are performed in layer 2 communications, and sending the request to set up the packet-based communication connection and sending the request to set up the docking session over the packet-based communication connection are performed in transport layer communications.

90. The non-transitory computer-readable storage medium of claim 89, wherein the instructions further configure the one or more processors such that the transport layer communications comprise communications in accordance with Transmission Control Protocol/Internet Protocol (TCP/IP) specifications.

91. The non-transitory computer-readable storage medium of claim 73, wherein the instructions further configure the one or more processors such that sending the request to the wireless docking host to select the one or more peripheral functions comprises specifying information on one or more of: the one or more peripheral functions, one or more protocols for the one or more peripheral functions, and one or more protocols for payload content associated with the one or more peripheral functions.

92. A non-transitory computer-readable storage medium comprising instructions stored thereon that, when executed, configure one or more processors to:
    respond to a peripheral function selection request from a wireless device indicating one or more selected peripheral functions in accordance with authentication and association information associated with a docking session by sending a peripheral function selection response to the wireless device, the peripheral function selection response comprising information associated with the one or more selected peripheral functions;
    respond to a payload connection request from the wireless device indicating one or more payload connections configured to communicate data for the one or more selected peripheral functions by sending a payload connection response to the wireless device, the payload connection response comprising information associated with establishing the one or more payload connections;
    detect a new change in available peripheral functions; and
    send a notice of the new change in the available peripheral functions to the wireless device.

93. The non-transitory computer-readable storage medium of claim 92, wherein the instructions further configure the one or more processors such that sending at least one of the peripheral function selection response and the payload connection response comprises sending a response via at least one of a SOAP payload or a General Event Notification Architecture (GENA) notification event.

94. The non-transitory computer-readable storage medium of claim 92, wherein the instructions further configure the one or more processors such that sending at least one of the peripheral function selection response and the payload connection response comprises sending a response via a binary protocol format message.

95. The non-transitory computer-readable storage medium of claim 92, wherein the instructions further configure the one or more processors to:
    receive a request to create a persistent wireless docking environment;
    create a persistent wireless docking environment;
    store information associated with the one or more selected peripheral functions in association with the persistent wireless docking environment to persist after the docking session; and send a persistent docking response to the wireless device, the persistent docking response comprising information associated with the persistent wireless docking environment.

96. The non-transitory computer-readable storage medium of claim 95, wherein the instructions further configure the one or more processors to:
receive a request from the wireless device to establish a subsequent docking session; and
apply the information associated with the one or more selected peripheral functions in association with the persistent wireless docking environment in establishing the subsequent docking session.

\* \* \* \* \*